United States Patent
Negishi et al.

(10) Patent No.: US 11,003,816 B2
(45) Date of Patent: May 11, 2021

(54) STRUCTURE ANALYSIS DEVICE AND STRUCTURE ANALYSIS METHOD

(71) Applicant: FUJITSU LIMITED, Kawasaki (JP)

(72) Inventors: Takanori Negishi, Nagano (JP); Yasuhiro Kawashima, Nagano (JP); Kazuya Yamaura, Nakano (JP); Masao Fukushima, Suzaka (JP); Tsuyoshi Tamaki, Ueda (JP); Toshio Arai, Nagano (JP); Toshiyasu Ohara, Nakano (JP)

(73) Assignee: FUJITSU LIMITED, Kawasaki (JP)

( * ) Notice: Subject to any disclaimer, the term of this patent is extended or adjusted under 35 U.S.C. 154(b) by 451 days.

(21) Appl. No.: 15/960,744

(22) Filed: Apr. 24, 2018

(65) Prior Publication Data

US 2018/0239854 A1    Aug. 23, 2018

Related U.S. Application Data

(63) Continuation of application No. PCT/JP2015/081098, filed on Nov. 4, 2015.

(51) Int. Cl.
*G06F 30/23* (2020.01)
*G06F 17/12* (2006.01)
(Continued)

(52) U.S. Cl.
CPC .............. *G06F 30/23* (2020.01); *G06F 17/12* (2013.01); *G01S 7/2927* (2013.01);
(Continued)

(58) Field of Classification Search
CPC ...... G06F 30/23; G06F 2111/10; G06F 30/15; G06F 2119/08; G06F 30/00; G06F 17/12; G06F 2111/04
See application file for complete search history.

(56) References Cited

U.S. PATENT DOCUMENTS 5,699,271 A * 12/1997 Sagawa ................... G06F 17/13
716/106
6,360,190 B1 * 3/2002 Kumashiro ............. G06F 30/23
703/2

(Continued)

FOREIGN PATENT DOCUMENTS

CN       100432993 C  * 11/2008
JP       4-273375         9/1992
(Continued)

OTHER PUBLICATIONS

CN-100432993 English Translation (Year: 2008).*

(Continued)

*Primary Examiner* — Kibrom K Gebresilassie
(74) *Attorney, Agent, or Firm* — Staas & Halsey LLP

(57) ABSTRACT

A structure analysis device includes a memory and a processor configured to obtain model information, evaluate a size of a model in accordance with the model information, select, in accordance with the evaluated size, either a direct method or an iterative method as a first algorithm of a simultaneous linear equation of a structure analysis solver that uses a finite element method, and execute structure analysis of the model by using the first algorithm.

16 Claims, 20 Drawing Sheets

(51) Int. Cl.
  *G06F 111/10* (2020.01)
  *H04N 1/32* (2006.01)
  *G06T 17/20* (2006.01)
  *G01S 7/292* (2006.01)
  *H04N 1/333* (2006.01)

(52) U.S. Cl.
  CPC .......... *G06F 2111/10* (2020.01); *G06T 17/20* (2013.01); *H04N 1/32448* (2013.01); *H04N 1/32454* (2013.01); *H04N 1/33376* (2013.01)

(56) References Cited

U.S. PATENT DOCUMENTS

| | | | | |
|---|---|---|---|---|
| 6,633,836 | B1* | 10/2003 | Yamaura | G06T 17/20 345/423 |
| 6,671,656 | B2* | 12/2003 | Shimamura | G06F 30/23 702/183 |
| 6,813,749 | B2* | 11/2004 | Rassaian | G06F 30/23 703/7 |
| 7,657,412 | B2* | 2/2010 | Honma | G06F 30/00 703/8 |
| 8,306,793 | B2* | 11/2012 | Huang | G06F 30/23 703/2 |
| 8,447,572 | B2* | 5/2013 | Ishikawa | G06F 30/23 703/1 |
| 9,449,123 | B2* | 9/2016 | Yiu | G01M 7/00 |
| 2002/0173939 | A1* | 11/2002 | Shimamura | G06F 30/23 703/2 |
| 2003/0016832 | A1* | 1/2003 | Naganarayana | G06F 30/15 381/71.4 |
| 2003/0063486 | A1* | 4/2003 | Noble | H01L 27/11 365/102 |
| 2004/0093195 | A1* | 5/2004 | Goto | G06F 30/23 703/2 |
| 2004/0143798 | A1* | 7/2004 | Washizawa | G06F 17/11 703/2 |
| 2007/0057938 | A1* | 3/2007 | Usami | G06F 30/23 345/419 |
| 2009/0012751 | A1* | 1/2009 | Kurita | G06F 30/23 703/1 |
| 2011/0301929 | A1* | 12/2011 | Huang | G06F 30/23 703/7 |
| 2014/0149090 | A1* | 5/2014 | Iorio | G06F 30/23 703/2 |
| 2014/0160127 | A1* | 6/2014 | Sundaram | G06T 17/205 345/424 |
| 2015/0204924 | A1* | 7/2015 | Aryanpour | H01M 10/48 702/30 |
| 2017/0293366 | A1* | 10/2017 | Shimizu | G01M 5/0091 |

FOREIGN PATENT DOCUMENTS

| | | |
|---|---|---|
| JP | 5-73527 | 3/1993 |
| JP | 2011-96190 | 5/2011 |

OTHER PUBLICATIONS

Japanese Office Action dated Jun. 11, 2019 from Japanese Patent Application No. 2017-548568, 10 pages.
International Search Report dated Feb. 2, 2016 in corresponding International Patent Application No. PCT/JP2015/081098.
Written Opinion of the International Searching Authority dated Feb. 2, 2016 in corresponding International Patent Application No. PCT/JP2015/081098.
Yusaku Yamamoto, "Direct Method for Sparse Matrix Simultaneous Linear Equations", pp. 1234-1238.
Toshiyasu Ohara et al., "Reduction of processing time of FEM structural analysis by a hybrid parallel iterative solver", Proceedings of the Conference on Computational Engineering and Science 19, Jun. 2014, pp. 7.

* cited by examiner

FIG. 6

MODEL INFORMATION ~111

(1)

| MODEL ID | ELEMENT ID |
|---|---|
| ma | en1,en2,en3, ... |

(2)

| ELEMENT ID | NODE ID |
|---|---|
| en1 | nn1,nn2,nn3,nn4 |
| ... | ... |

(3)

| NODE ID | NODE POSITION INFORMATION |
|---|---|
| nn1 | xn1,yn1 |
| ... | ... |

(4)

| MODEL ID | VOLUME | MASS | MAIN MOMENT OF INERTIA | NUMBER OF NODES | ELEMENT TYPE | MESH SIZE | NUMBER OF ELEMENTS | NUMBER OF DEGREES OF ANALYSIS FREEDOM | VOLUME OF MINIMUM SPHERE | SURFACE AREA | BOUNDARY CONDITION ||| LOAD CONDITION |
|---|---|---|---|---|---|---|---|---|---|---|---|---|---|---|
| | | | | | | | | | | | CONSTRAINT CONDITION | CONSTRAINT AREA | NUMBER OF DEGREES OF CONSTRAINT FREEDOM | |
| ma | v1 | m1 | I1x, I1y, I1z | n1 | e1 | x1, y1, z1 | e1 | f1 | vb1 | sa1 | FIXING OF ONE SIDE END SURFACE | a1 | af1 | GRAVITY LOAD IN -Y DIRECTION |

FIG. 7

| NUMBER OF ELEMENTS | THRESHOLD VALUE OF MEMORY CAPACITY |
|---|---|
| 1~3000 | mt1 |
| 3001~5000 | mt2 |
| 5001~7000 | mt3 |
| 7001~10000 | mt4 |

700 mt1<mt2<mt3<mt4

FIG. 9
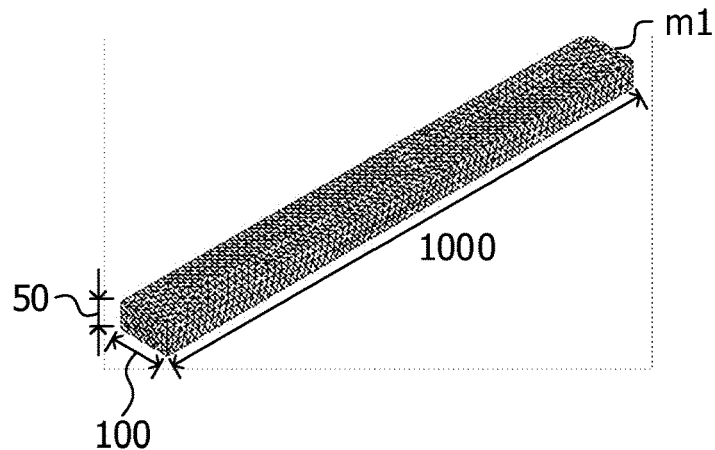
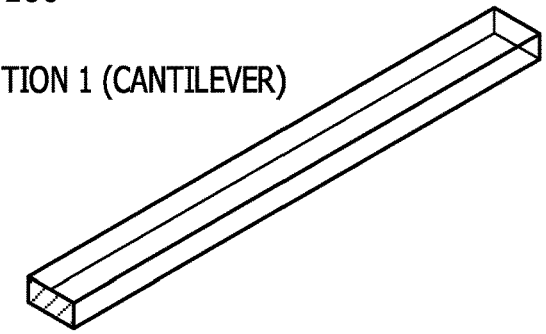
CONSTRAINT CONDITION 1 (CANTILEVER)
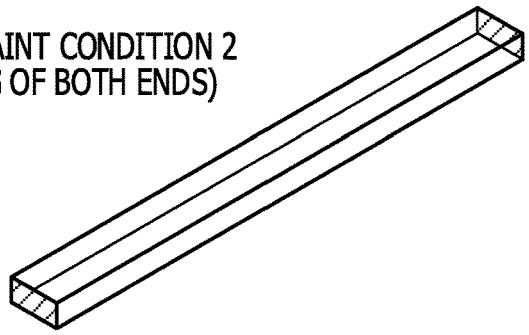
CONSTRAINT CONDITION 2
(FIXING OF BOTH ENDS)
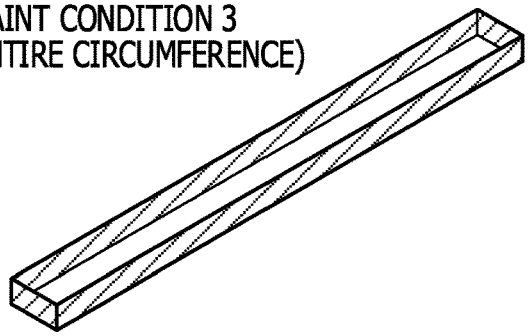
CONSTRAINT CONDITION 3
(FIXING OF ENTIRE CIRCUMFERENCE)

FIG. 10

| MODEL SIZE (NUMBER OF ELEMENTS) | 5,000 |
|---|---|
| SHAPE | RECTANGULAR PARALLELEPIPED OF 50mm×100mm×1000mm |
| (1) SURFACE AREA (mm^2) | 310,000 |
| (2) NUMBER OF DEGREES OF FREEDOM PER ONE NODE | 3 |

| CONSTRAINT CONDITION | 1. CANTILEVER | 2. FIXING OF BOTH ENDS | 3. FIXING OF ENTIRE CIRCUMFERENCE |
|---|---|---|---|
| (3) CONSTRAINT AREA (mm^2) | 5,000 | 10,000 | 110,000 |
| (4) NUMBER OF DEGREES OF CONSTRAINT FREEDOM PER ONE NODE | 3 | 3 | 3 |
| STRENGTH ON CONSTRAINT CONDITION ((3)/(1))*((4)/(2)) | 0.016 | 0.032 | 0.355 |

<EXAMPLE OF ANALYSIS TIME>

| | 1. CANTILEVER | 2. FIXING OF BOTH ENDS | 3. FIXING OF ENTIRE CIRCUMFERENCE |
|---|---|---|---|
| (5) DIRECT METHOD (S) | 0.72 | 0.69 | 0.47 |
| (6) ITERATIVE METHOD (S) | 3.06 | 1.86 | 0.30 |
| PERFORMANCE RATIO (5)/(6) | 0.24 | 0.37 | 1.57 |

| THRESHOLD VALUE |
|---|
| 0.202 |

FIG. 11

| MODEL SIZE (NUMBER OF ELEMENTS) | 10,000 |
|---|---|
| SHAPE | RECTANGULAR PARALLELEPIPED OF 50mm×100mm×1000mm |
| (1) SURFACE AREA (mm^2) | 310,000 |
| (2) NUMBER OF DEGREES OF FREEDOM PER ONE NODE | 3 |

| | CONSTRAINT CONDITION | 1. CANTILEVER | 2. FIXING OF BOTH ENDS | 3. FIXING OF ENTIRE CIRCUMFERENCE |
|---|---|---|---|---|
| (3) | CONSTRAINT AREA (mm^2) | 5,000 | 10,000 | 110,000 |
| (4) | NUMBER OF DEGREES OF CONSTRAINT FREEDOM PER ONE NODE | 3 | 3 | 3 |
| | STRENGTH ON CONSTRAINT CONDITION ((3)/(1))*((4)/(2)) | 0.016 | 0.032 | 0.355 |

<EXAMPLE OF ANALYSIS TIME>

| | | 1. CANTILEVER | 2. FIXING OF BOTH ENDS | 3. FIXING OF ENTIRE CIRCUMFERENCE |
|---|---|---|---|---|
| (5) | DIRECT METHOD (S) | 2.35 | 2.26 | 1.62 |
| (6) | ITERATIVE METHOD (S) | 7.69 | 4.78 | 0.75 |
| | PERFORMANCE RATIO (5)/(6) | 0.31 | 0.47 | 2.16 |

| THRESHOLD VALUE |
|---|
| 0.133 |

FIG. 12

| NUMBER OF ELEMENTS | THRESHOLD VALUE |
|---|---|
| 3000 | th1 |
| 5000 | th2 |
| 7500 | th3 |
| 10000 | th4 |

<ANALYSIS TARGET MODEL>

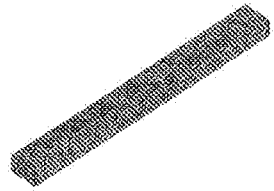

<CONSTRAINT CONDITION>

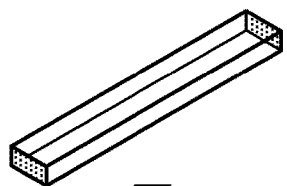

| | MODEL | ANALYSIS TARGET MODEL |
|---|---|---|
| | DIMENSION (mm) | 50×100×500 |
| | TYPE OF SHAPE | - |
| | NUMBER OF NODES | 7,887 |
| | NUMBER OF ELEMENTS (TETRAHEDRON SECONDARY ELEMENT) | 4,724 |
| (1) | SURFACE AREA (mm^2) | 1.60E+05 |
| (2) | NUMBER OF DEGREES OF FREEDOM PER ONE NODE | 3 |
| | CONSTRAINT CONDITION | FIXING OF BOTH ENDS |
| (3) | CONSTRAINT AREA (mm^2) | 1.00E+04 |
| (4) | NUMBER OF CONSTRAINT DEGREES PER ONE NODE | 3 |
| | STRENGTH ON CONSTRAINT CONDITION (((3)/(1))*((4)/(2))) | 6.25E-02 |

< | THRESHOLD VALUE (NUMBER OF ELEMENTS 5000) |
|---|
| 0.202 |

SELECT DIRECT METHOD

FIG. 18

| SERVER ID | STATE | MEMORY CAPACITY | NUMBER OF CPUs |
|---|---|---|---|
| 1 | UNUSED | mm1 | c1 |
| 2 | UNUSED | mm2 | c2 |
| 3 | IN USE | mm3 | c3 |
| 4 | UNUSED | mm4 | c4 |
| ... | ... | ... | ... |

1800

<DEFINE OF MEMORY CAPACITY>

$mm1=mm2=mm3<mm4$
$(mm1+mm2<mm4)$

<DEFINE OF NUMBER OF CPUs>

$c1=c2=c3<c4$

STRUCTURE ANALYSIS DEVICE AND STRUCTURE ANALYSIS METHOD

CROSS-REFERENCE TO RELATED APPLICATIONS

This application is a continuation application of International Application PCT/JP2015/081098 filed on Nov. 4, 2015 and designated the U.S., the entire contents of which are incorporated herein by reference.

FIELD

The embodiments discussed herein are related to a structure analysis technology.

BACKGROUND

In the related art, a structure analysis technology using a finite element method is known. In structure analysis using the finite element method, for example, by solving simultaneous linear equations, displacement or stress of a structure is obtained. Since computational complexity of solving the simultaneous linear equation is large and it takes time to calculate the simultaneous linear equation, there are various technologies for solving the simultaneous linear equation at high speed using a calculator. As a solution of the simultaneous linear equation, for example, a direct method and an iterative method can be used as a large classification. For example, the direct method is a solution of directly solving the simultaneous linear equation by triangulating a coefficient matrix, whereas the iterative method is a solution method of finding an approximate solution by iterative calculation.

As an algorithm of the simultaneous linear equation solution represented by the direct method and the iterative method, various technologies to solve more quickly by using the calculator more efficiently are developed. For example, an algorithm of the direct method in a sparse matrix direction is introduced in Yusaku Yamamoto: "Direct solution of sparse matrix simultaneous linear equation". An algorithm of the iterative method suitable for a parallel process and a calculation example of the algorithm are introduced in Ohara Toshiyasu, Kawashima Yasuhiro, and Fujino Seiji: "Shorter processing time for FEM structure analysis by Hybrid iterative solver", Proceedings of the Conference on Computational Engineering and Society 19, 4p, 2014-06.

SUMMARY

According to an aspect of the invention, a structure analysis device includes a memory and a processor configured to obtain model information, evaluate a size of a model in accordance with the model information, select, in accordance with the evaluated size, either a direct method or an iterative method as a first algorithm of a simultaneous linear equation of a structure analysis solver that uses a finite element method, and execute structure analysis of the model by using the first algorithm.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram illustrating an example of model information;

FIG. 7 is an explanatory diagram illustrating an example of a threshold value of a memory capacity according to the number of elements;

FIG. 9 is an explanatory diagram illustrating an example of a model used for deriving the threshold value;

FIG. 10 is an explanatory diagram illustrating an example of deriving the threshold value in a case where the number of the elements is 5000;

FIG. 11 is an explanatory diagram illustrating an example of deriving the threshold value in a case where the number of the elements is 10000;

FIG. 12 is an explanatory diagram illustrating an example of the threshold value according to the model size;

FIG. 13 is an explanatory diagram illustrating an example of calculating strength on a constraint condition and an example of selecting a solution method;

FIG. 18 is an explanatory diagram illustrating an example of a state of a server and management of the memory capacity;

ASCRIPTION OF EMBODIMENTS

A solution method of a simultaneous linear equation has merits and demerits and there is no solution to solve all of problems reliably and quickest. In the related art, if numerical analysis is performed by using a simultaneous linear equation solution algorithm of a structure analysis solver using a finite element method of an analysis target model as a specific solution, there is a problem that analysis time by the analysis target model becomes longer than other solution methods. For example, in a direct method, in some cases, as a non-zero region increases due to characteristics of the simultaneous linear equation, computational complexity and a memory capacity become more desirable and the analysis time may become longer. On the other hand, for example, in an iterative method, in some cases, it may be difficult to converge the solution due to characteristics of the simultaneous linear equation and the analysis time may become longer.

Hereinafter, embodiments of a structure analysis method and a structure analysis program according to the present embodiment will be described with reference to drawings.

Figure 1:
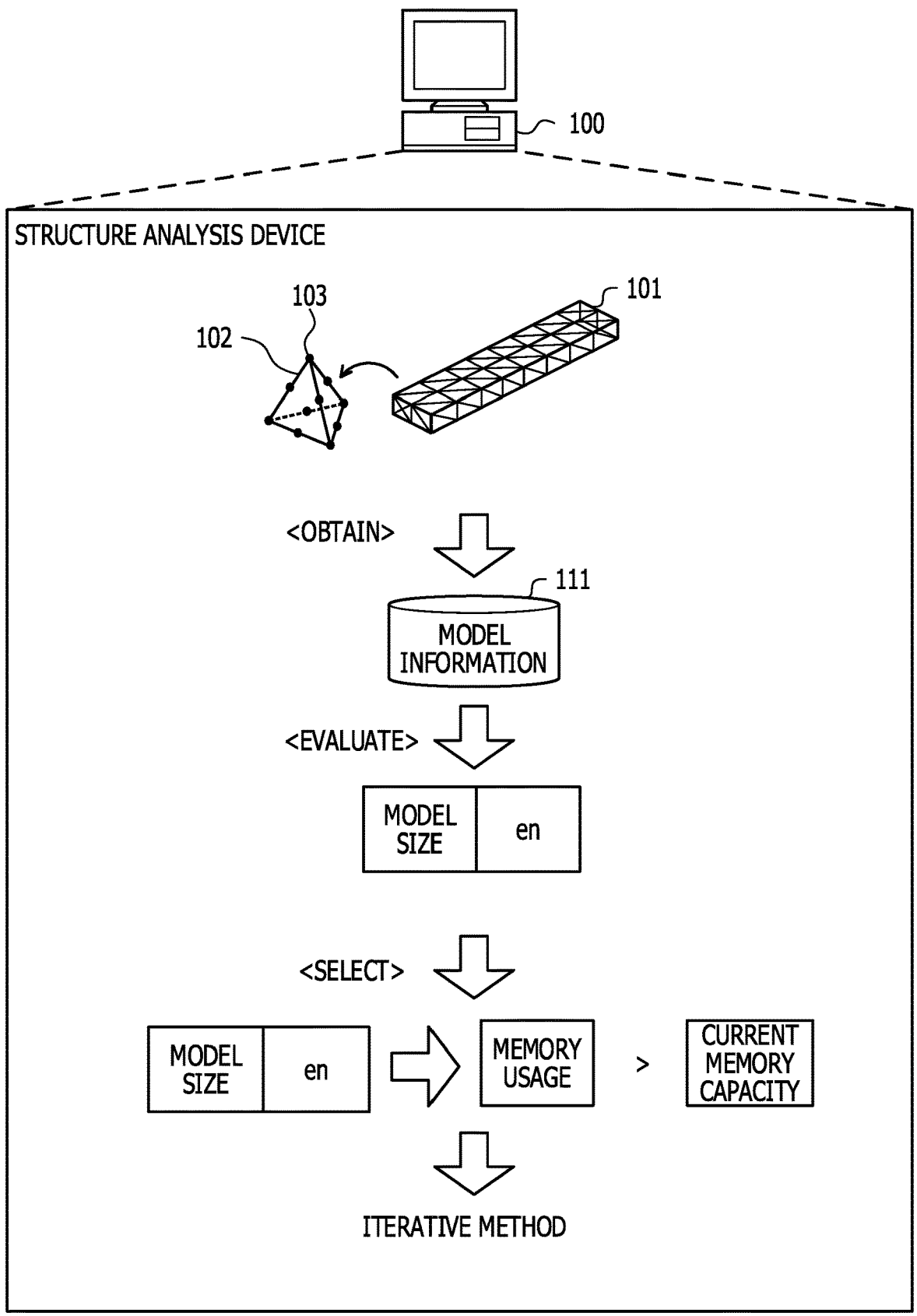
FIG. 1 is an explanatory diagram illustrating an operation example of a structure analysis device according to the present embodiment.

FIG. 1 is an explanatory diagram illustrating an operation example of a structure analysis device according to the present embodiment. A structure analysis device 100 is a computer which performs structure analysis using the finite element method on a finite element method (FEM) model of the analysis target. Here, the finite element method is a numerical analysis method for approximately solving a differential equation. By the structure analysis, for example, displacement as an index of stiffness, stress as an index of strength, and the like are evaluated.

The FEM model of the analysis target is hereinafter simply referred to as a model, an analysis target model, or the like. In the finite element method, a region in which equations are defined is divided into small regions and the equations in each of the small regions are approximated by a common interpolation function. Here, the small region is referred to as an element 102. For example, a node 103 is disposed at each of vertexes in the element 102. In the structure analysis using the finite element method, a region defined by the equation is a structure of the analysis target. By approximating a structure of the analysis target, an analysis target model 101 is in a state in which structure analysis by the FEM is possible and the analysis target model 101 is disposed on simulation space.

The simulation space is space set for representing an analysis region including an inside of a physical structure of the analysis target and an outside of the structure on the computer. In the analysis target model 101, the structure of the analysis target is divided into the elements 102 which are fine and small regions and an entire shape is represented as a group of the elements 102. A group of the elements 102 is referred to as a mesh. A size of one grid in the mesh is also referred to as a mesh size.

Figure 2:
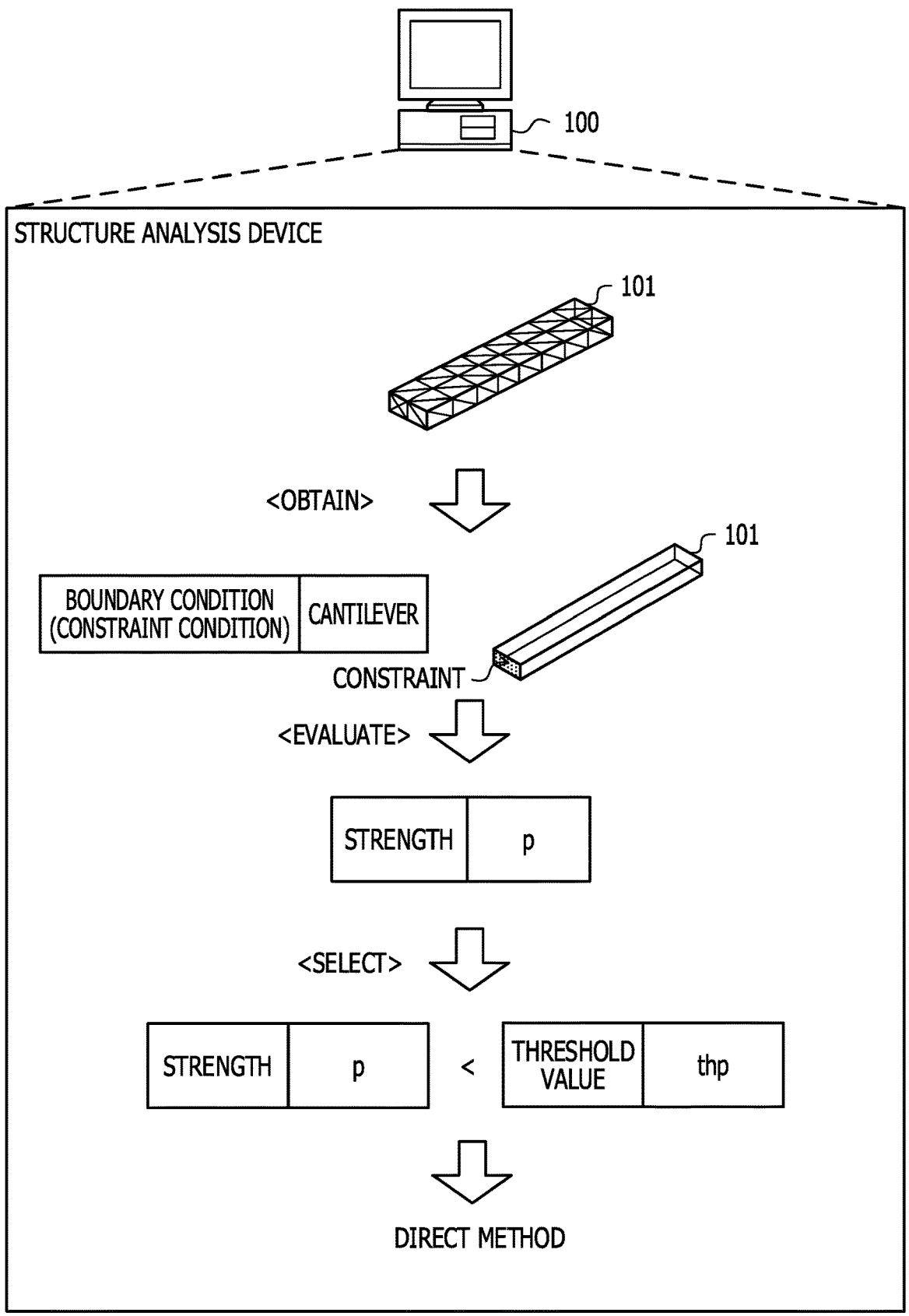
FIG. 2 is an explanatory diagram illustrating another operation example of the structure analysis device according to the present embodiment.

A shape of one element 102 is a quadrangle, a triangle, or the like in a case of two dimensions and a tetrahedron, a pentahedron, a hexahedron, or the like in a case of three dimensions. FIG. 1 illustrates an example of a secondary element of a tetrahedron as the element 102 and FIG. 2 illustrates an example of the shape of the element 102 and a relationship between the element 102 and a node 103 in detail.

A developer generates three-dimensional model information of a three-dimensional model obtained by the structure being represented by a polygon using, for example, computer aided design (CAD). The three-dimensional model information includes, for example, coordinate data of the polygon. Next, by using computer aided engineering (CAE), the developer simulates whether a designed structure satisfies a demand performance on the computer before actually making the structure. Here, the CAE includes three pieces of software called a preprocessor, a solver and a post processor, for example.

First, the preprocessor of the CAE can generate model information 111 which represents the FEM model by performing mesh division and boundary condition definition. Next, the solver of CAE is a structure analysis solver which performs numerical analysis on the FEM model represented by the model information 111. Finally, the postprocessor of the CAE visualizes an analysis result obtained by the solver of the CAE.

In the related art, in structure analysis by the FEM, by solving a force balance equation, displacement or stress of the structure can be obtained. The force balance equation is a simultaneous linear equation. The simultaneous linear equation is also expressed as "Ku=f". K is a stiffness matrix. u is a vector expressing displacement of each of the nodes 103 for each of degree of freedom. u is an unknown vector obtained by analysis. f is a vector expressing a load. In a case where a load condition is set, f is a load value corresponding to degree of freedom of each of the nodes 103.

In the related art, since computational complexity of solving the simultaneous linear equation is large and it takes time to calculate the simultaneous linear equation, there are various methods for solving at high speed using a calculator. As a solution method of the simultaneous linear equation, there are the direct method and the iterative method. The direct method is a solution of directly solving the simultaneous linear equation, for example, by triangulating a coefficient matrix. As a direct method, for example, there is a multifrontal method. The iterative method is a solution of finding an approximate solution by iterative calculation. As an iterative method, there is, for example, a CG method with a pre-process.

However, in the related art, if numerical analysis is performed by using a simultaneous linear equation solution algorithm of a structure analysis solver using a finite element method of the analysis target model 101 as a specific solution, there is a problem that analysis time by the model becomes longer than other solution methods. For example, generally, the direct method desires the more memory capacity than the iterative method. In addition, in the direct method, in some cases, as a non-zero region increases due to characteristics of the simultaneous linear equation, computational complexity and the memory capacity become more desirable and the analysis time may become longer. On the other hand, for example, in the iterative method, in some cases, if the analysis target model 101 is unstable such as a case where constraint on the model 101 on a constraint condition is insufficient, it may be difficult to converge the solution and the analysis time may become longer.

In the present embodiment, the structure analysis device 100 evaluates a model size based on information on the analysis target model 101 and selects either the direct method or the iterative method as a solution method by the simultaneous linear equation using the FEM depending on the model size. Accordingly, since memory usage can be estimated, analysis by the direct method can be possible without a memory lack and the analysis time can be reduced.

First, the structure analysis device 100 obtains the model information 111. For example, the model information 111 includes information on a shape of the analysis target model 101. An example of the model information 111 will be described in detail with reference to FIG. 6 described below.

Next, the structure analysis device 100 evaluates a size of the analysis target model 101 based on the obtained model information 111. For example, the structure analysis device 100 evaluates the model size based on the number of the elements and/or the number of the nodes, and/or the number of the degrees of analysis freedom calculated from the model information 111, a mesh size, and an element type.

The structure analysis device 100 selects either the direct method or the iterative method as an algorithm of the simultaneous linear equation solution of the structure analysis solver using the finite element method of the analysis target model 101 based on the evaluated model size. For example, as the model size is larger, the structure analysis device 100 selects the iterative method.

Since the number of the nodes 103 to be analyzed increases as the model size of the analysis target model 101 is larger, the memory usage increases. For this reason, the structure analysis device 100 selects either the direct method or the iterative method as the algorithm based on the evaluated model size and the memory usage usable during analysis.

Specifically, for example, in a case where the memory capacity used to analyze the model size of the analysis target model 101 by using the direct method is less than the memory usage usable during analysis, the structure analysis device 100 selects the direct method. On the other hand, in a case where the memory capacity used to analyze the model size of the analysis target model 101 by using the direct method is equal to or more than the memory usage usable during analysis, the structure analysis device 100 selects the iterative method. In FIG. 1, the structure analysis device 100 selects the iterative method.

For example, an estimated value of the memory capacity used for model analysis can be calculated based on the model size calculated from the element type, the number of the elements, the number of the nodes, and the like. For example, in a case of using the direct method, it may be prepared in advance in a storage device or the like how much memory capacity is used for one element. The structure analysis device 100 may calculate the used memory capacity according to the number of the elements of the analysis target model 101.

For example, in some cases, since accuracy of analysis by the direct method is generally higher than accuracy of analysis by the iterative method, in a case where it is understood that it takes less time for analysis by the direct method, the direct method is used to increase accuracy. However, as described above, in a case of analysis by the direct method, if the memory usage is insufficient, it takes more time for analysis. For this reason, since the memory usage can be estimated by selecting an analysis method according to the model size, analysis by the direct method can be possible without a memory lack and the analysis time can be reduced with increased accuracy.

FIG. 2 is an explanatory diagram illustrating another operation example of the structure analysis device according to the present embodiment. The structure analysis device 100 is a computer which performs structure analysis using the finite element method on the FEM model of the analysis target. The structure analysis device 100 illustrated in FIG. 2 and the structure analysis device 100 illustrated in FIG. 1 may be the same device or may be different devices, and thus the same reference numerals are used. In addition, in the example illustrated in FIG. 2 and the example illustrated in FIG. 1, a detailed description of the same configuration and function will be omitted.

As described in FIG. 1, if numerical analysis is performed by using the simultaneous linear equation solution algorithm of the structure analysis solver using the finite element method of the analysis target model 101 as a specific solution, there is a problem that analysis time by the model becomes longer than other solution methods. In the direct method, for example, in some cases, since the more memory capacity is used during analysis, the analysis time becomes longer. On the other hand, for example, in the iterative method, in some cases, if constraint on the model 101 on the constraint condition is insufficient, the solution is not converged. For this reason, in some cases, the analysis time becomes longer.

In the present embodiment, the structure analysis device 100 evaluates strength on a boundary condition of the analysis target model 101 and selects either the direct method or the iterative method as a solution method by the simultaneous linear equation using the FEM depending on the strength of the boundary condition. Accordingly, it is possible to reduce the analysis time. Here, the boundary condition is a condition to be set to a boundary for express a load state of the structure. For example, the boundary condition has two types of the constraint condition and the load condition. The constraint condition is a condition such as which part is fixed, how to fixed, and how much forced displacement is given for the structure of the analysis target. The load condition is a condition such as how much force is applied to which part in which direction. For example, in case where strength on the boundary condition is strength on the constraint condition, it is possible to determine whether or not a calculation model is stable by constraint of the boundary on the constraint condition and it is possible to reduce the analysis time.

First, the structure analysis device 100 obtains the boundary condition of the analysis target model 101. Next, the structure analysis device 100 evaluates strength on the boundary condition of the analysis target model 101 based on the obtained boundary condition. For example, the strength on the boundary condition includes at least strength on the constraint condition and weakness on the load condition.

In the constraint condition, a type or a direction of constraint and a constrained position or region are set. For example, the strength on the constraint condition is strength constrained by the analysis target model 101 on the constraint condition. For example, the strength on the constraint condition is evaluated based on an area of a region corresponding to a constrained range on a surface of the analysis target model 101 according to the constraint condition as described below. In the load condition, a type of a load, a size or a direction of the load, and a position or a region to which the load is applied is set. For example, the weakness of the load condition is a reciprocal number of a size of influence of the load condition on stiffness. For example, the weakness of the load condition is evaluated based on a reciprocal number of a size of influence of the load condition on stiffness.

For example, the structure analysis device 100 selects either the direct method or the iterative method as the algorithm of the simultaneous linear equation solution of the structure analysis solver using the finite element method of the analysis target model 101 based on strength on the evaluated boundary condition. For example, as the strength on the boundary condition is larger, the structure analysis device 100 selects the iterative method.

Here, the strength of the constraint condition will be described as an example. Since as the strength on the constraint condition of the analysis target model 101 is larger, the analysis model by constraint of the boundary on the constraint condition is stable, a possibility that the solution is converged by the iterative method increases. On the other hand, since as the strength on the constraint condition of the analysis target model 101 is smaller, the analysis model by constraint of the boundary on the constraint condition is insufficient, a possibility that the solution is not converged by the iterative method increases.

In a case where the strength on the constraint condition is equal to or more than a threshold value, the structure analysis device 100 selects the iterative method and in a case where the strength on the constraint condition is less than the threshold value, the structure analysis device 100 selects the direct method. In this way, it is possible to determine degree of stability of the boundary by the strength on the constraint condition and to reduce the analysis time.

Figure 3:
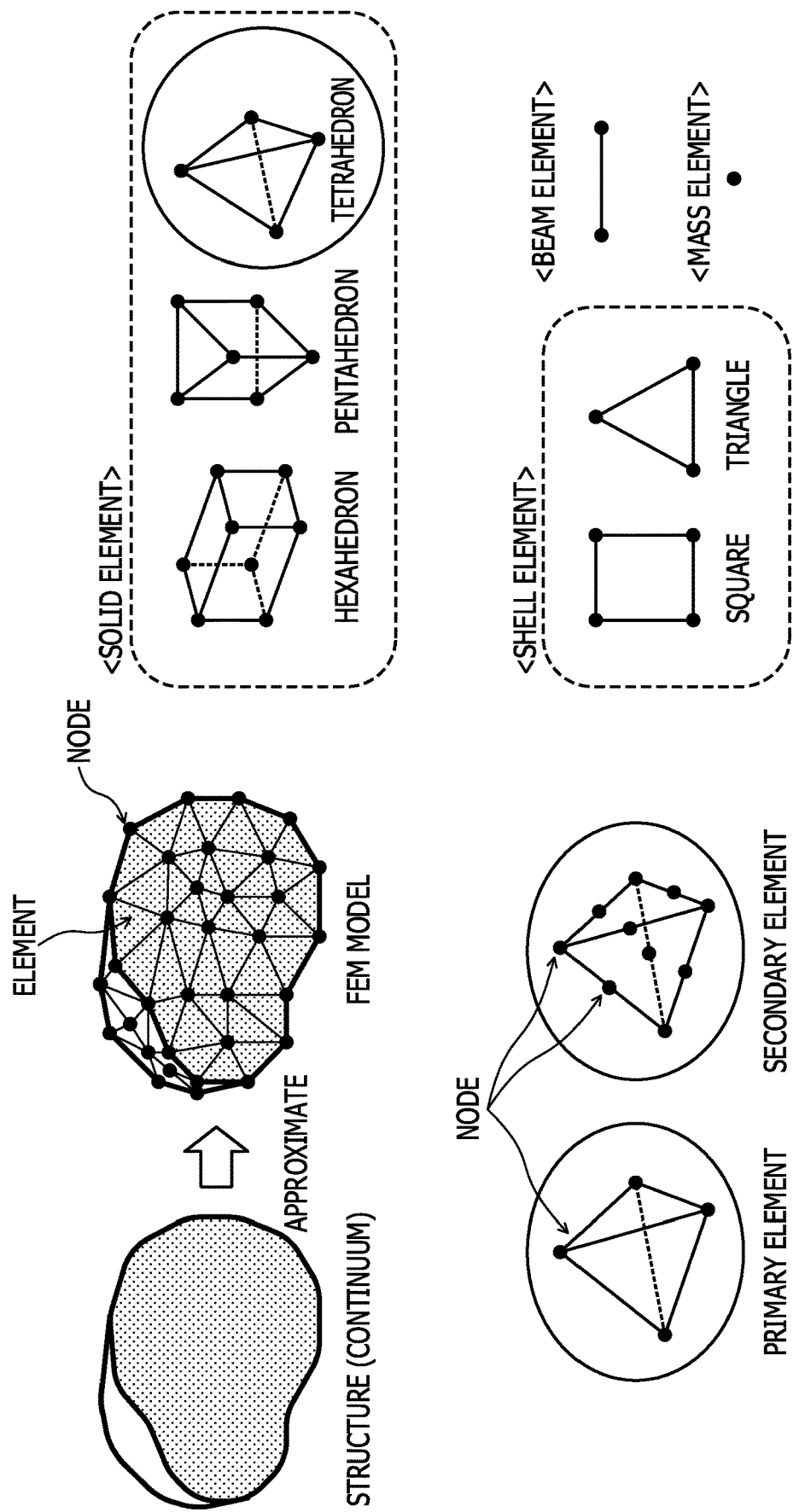
FIG. 3 is an explanatory diagram illustrating an element and a node used for structure analysis of a finite element method.

FIG. 3 is an explanatory diagram illustrating the element and the node used for structure analysis of the finite element method. As illustrated in FIG. 3, the structure is, for example, a continuum. As described above, the preprocessor of the CAE generates the FEM model by approximating the three-dimensional model of the structure generated on a three-dimensional simulation space.

As illustrated in FIG. 3, the element types include three-dimensional solid elements, two-dimensional shell elements, one-dimensional beam elements or truss elements, zero-dimensional mass elements, and the like. A shape of the solid element may be a hexahedron, a pentahedron, a tetrahedron, or the like. A shape of the shell element may be a square, a triangle, or the like. In addition, a shape of the beam element or the truss element may be a line. A shape of the mass element may be a dot.

As illustrated in FIG. 3, for example, in a case where the element shape is a tetrahedron, there are a plurality of methods of defining nodes such as a primary element and a secondary element. In a case of the primary element, the node included in the element is a vertex of a tetrahedron. In a case of the secondary element, the node is a vertex of a tetrahedron and a center point of a line connecting between the vertexes. In this way, the number of the nodes constituting the element is different from one another according to the element shape and the method of defining the nodes. In the present embodiment, the element type will be described by using the secondary element of a tetrahedron.

Here, the solid element is also referred to as a solid matter element. Here, the shell element is also referred to as a plate element. Here, the beam element is also referred to as a girder element. According to these element types, the number of the degrees of freedom of analysis of the nodes to be respectively described below is different with one another.

Example of Hardware Configuration of Structure Analysis Device 100

Figure 4:
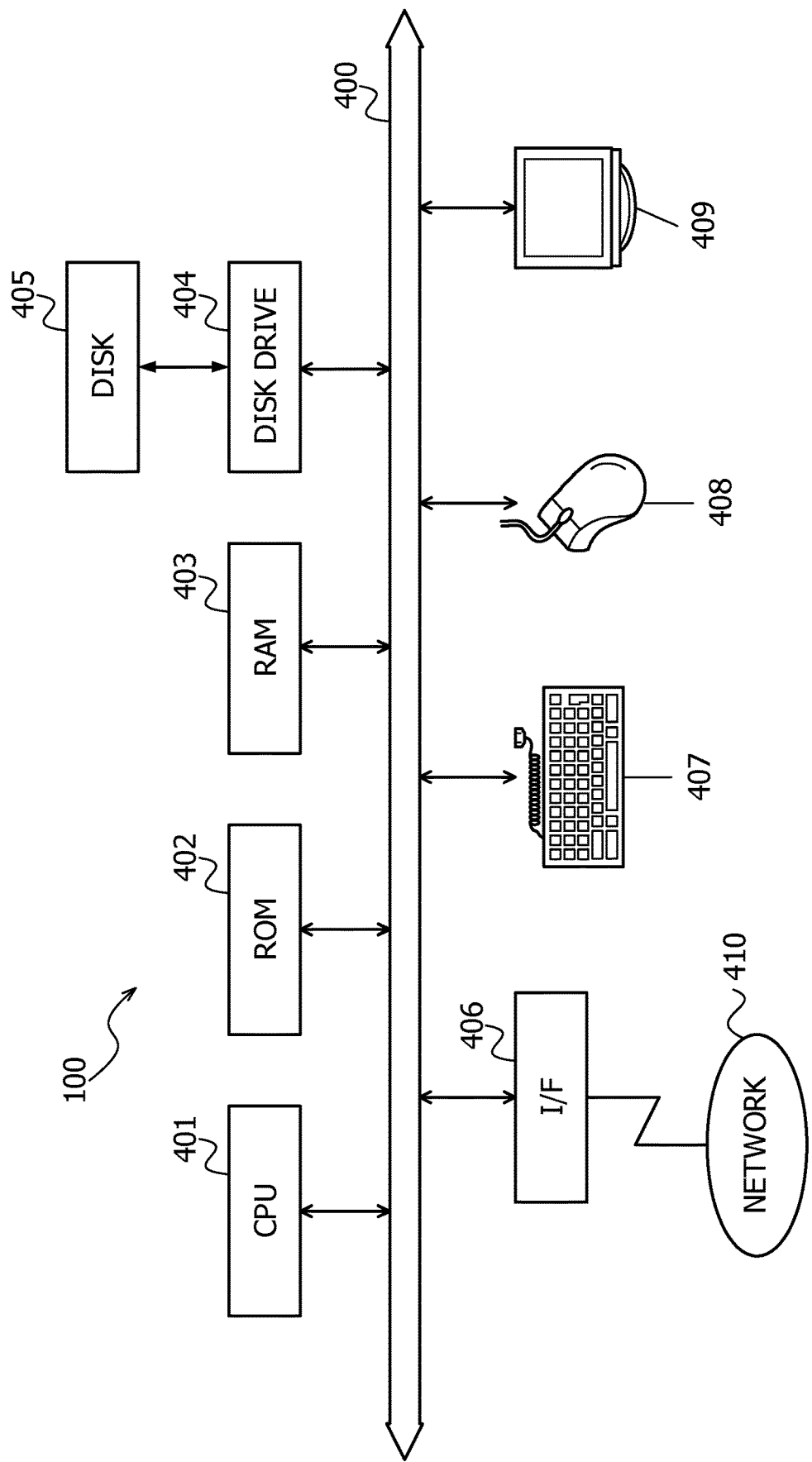
FIG. 4 is a block diagram illustrating an example of a hardware configuration of the structure analysis device.

FIG. 4 is a block diagram illustrating an example of a hardware configuration of the structure analysis device. In FIG. 4, the structure analysis device 100 includes a central processing unit (CPU) 401, a read only memory (ROM) 402, a random access memory (RAM) 403, a disk drive 404, and a disk 405. In addition, the structure analysis device 100 includes an interface (I/F) 406, a keyboard 407, a mouse 408, and a display 409. Further, the CPU 401, the ROM 402, the RAM 403, the disk drive 404, the I/F 406, the keyboard 407, the mouse 408, and the display 409 are connected with one another by a bus 400.

Here, the CPU 401 controls the entire structure analysis device 100. The ROM 402 stores a program such as a boot program. The RAM 403 is used as a work area of the CPU 401. The disk drive 404 controls reading/writing of data from and to the disk 405 under the control of the CPU 401. The disk 405 stores the data written by the control of the disk drive 404. As the disk 405, a magnetic disk, an optical disk, and the like can be used.

The I/F 406 is connected to a network 410 such as a local area network (LAN), a wide area network (WAN), the internet, or the like via a communication line and is connected to other devices via the network 410. The I/F 406 controls an interface between the network 410 and an inside and controls input and output of data from an external device. The I/F 406 can adopt, for example, a modem, a LAN adapter, or the like.

The keyboard 407 and the mouse 408 are interfaces for inputting various types of data by operation of a user. The display 409 is an interface for outputting data in response to an instruction from the CPU 401.

Although not illustrated, the structure analysis device 100 may be provided with an input device which captures an image and a move from a camera and an input device which captures sound from a microphone. Although not illustrated, the structure analysis device 100 may be provided with an output device such as a printer.

Example of Functional Configuration of Structure Analysis Device 100

Figure 5:
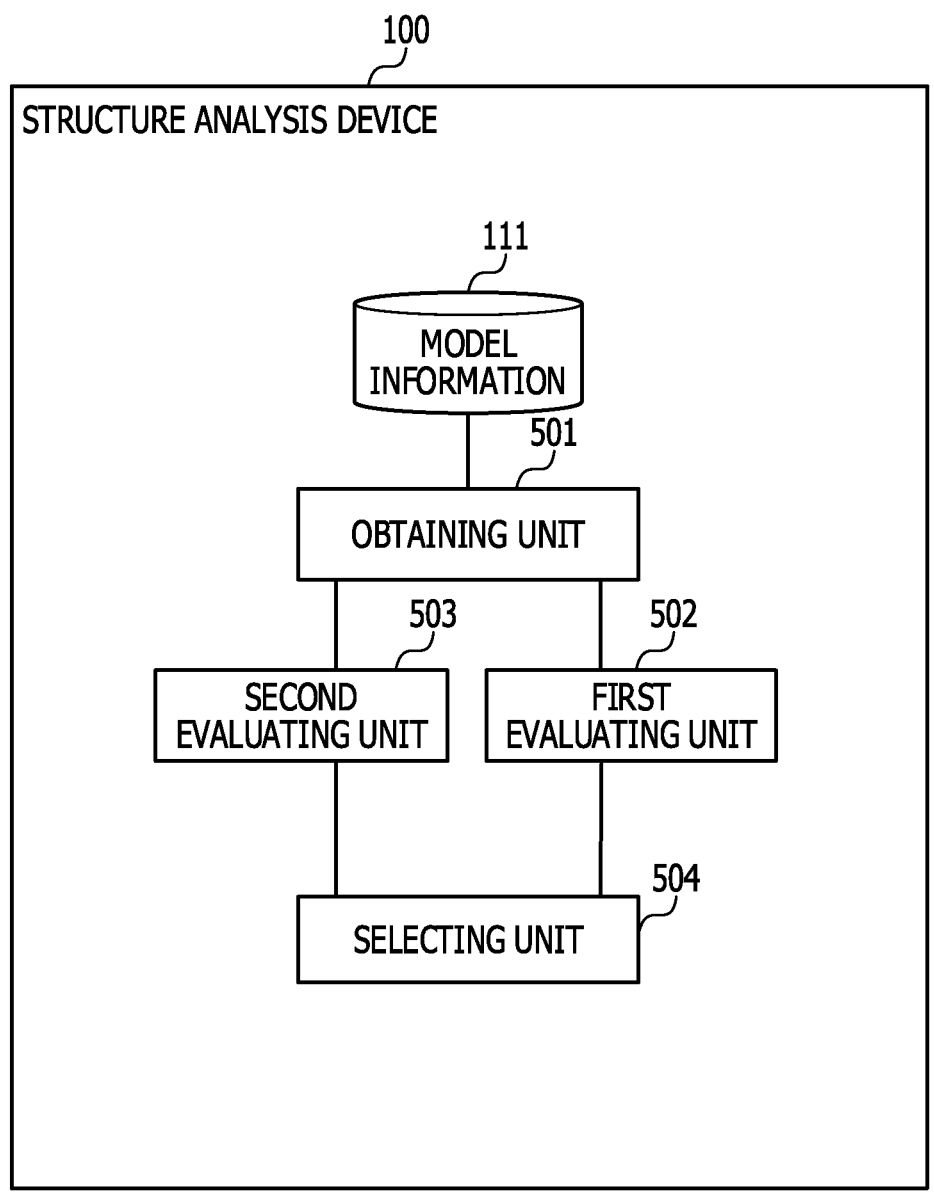
FIG. 5 is a block diagram illustrating an example of a functional configuration of the structure analysis device.

FIG. 5 is a block diagram illustrating an example of a functional configuration of the structure analysis device. The structure analysis device 100 includes an obtaining unit 501, a first evaluating unit 502, a second evaluating unit 503, and a selecting unit 504. Processes of controllers from the obtaining unit 501 to the selecting unit 504 are coded in, for example, a program stored in the storage device such as the ROM 402, the RAM 403, the disk 405, or the like accessible by the CPU 401 illustrated in FIG. 4. The CPU 401 reads the program from the storage device and executes the process coded in the program. Accordingly, the process of the controller is realized. In addition, a process result of the controller is stored in, for example, the storage device such as the ROM 402, the RAM 403, the disk 405, or the like.

The obtaining unit 501 obtains the model information 111. The model information 111 is information which represents the analysis target model. For example, the model information 111 includes information on a shape of the analysis target model. In addition, the information on the shape of the model is element information of the element included in the model, the node included in the element, position information of the node, or the like. The information on the shape of the analysis target model may be, for example, information such as a volume, a surface area, or the like. Further, the obtained model information 111 may include information which represents a material or the like of the model. In addition, the obtained model information 111 may include information on the boundary condition set to the model during analysis. Further, the obtained model information 111 may include information of an output item of a result. The information of the output item of the result is information obtained by calculating and outputting the analysis result of displacement, stress, reaction force, or the like.

FIG. 6 is an explanatory diagram illustrating an example of the model information. In (1) to (3) of FIG. 6, the element information of the element included in the model, the node included in the element, the position information of the node, or the like are illustrated as the model information 111. In addition, (4) of FIG. 6 illustrates information representing the shape of the model, information representing the material of the model, information representing the boundary condition set to the model during analysis, and the like as the model information 111. Here, the boundary condition is a condition to be set to a boundary for express a load state of the structure. For example, the boundary condition has two types of the constraint condition and the load condition. The constraint condition is a condition such as which part is fixed, how to fixed, and how much forced displacement is given for the structure of the analysis target. The load condition is a condition such as how much force is applied to which part in which direction.

In (1) of FIG. 6, the model information 111 includes fields of a model ID and an element ID. Identification information for identifying the model is set to the field of the model ID. Identification information for identifying the element included in the analysis target model is set to the field of the element ID. In the example in (1) of FIG. 6, a model ma includes elements en1 to en3.

Next, in (2) of FIG. 6, the model information 111 includes fields of the element ID and a node ID. Identification information for identifying the element is set to the field of the element ID. Identification information for identifying the node included in the element is set to the field of the node ID. In the example in (2) of FIG. 6, the element en1 includes nodes nn1 to nn4.

In (3) of FIG. 6, the model information 111 includes fields of the node ID and node position information. Identification information for identifying the node is set to the field of the node ID. Position information of the node is set to the field of the node position information. The position information of the node is, for example, coordinate values of an x-axis, a y-axis, and a z-axis of the node.

The structure analysis device 100 can specify the shape of the model by using the model information 111 illustrated in (1) to (3) of FIG. 6. For example, the structure analysis device 100 can calculate the volume, the surface area, and the like of the model.

Next, in (4) of FIG. 6, the model information 111 includes fields of the model ID, the volume, a mass, a main moment of inertia, the number of the nodes, the element type, the mesh size, the number of the elements, the number of degrees of analysis freedom, a volume of a minimum sphere, the surface area, the boundary condition, and the like. Identification information for identifying the model is set to the field of the model ID. The volume of the model is set to the field of the volume. The mass of the model is set to the field of the mass. The main moment of inertia of the model is set to the field of the main moment of inertia. Here, the volume, the mass, or the main moment of inertia is information determined by the material or the shape of the model.

Information for identifying the element type illustrated in FIG. 2 is set to the field of the element type. In addition, for example, a total of the number of degrees of freedom of each of the nodes included in the model is set to the field of the number of degrees of analysis freedom. The final number of degrees of analysis freedom is not proved assembly of the simultaneous linear equation performed inside the solver of the CAE is completed. For this reason, for example, an approximate value such as the number of the nodes x the number of degrees of freedom per one node may be set to the number of degrees of analysis freedom.

A length of the one representative element when dividing the mesh is set to the field of the mesh size. In the present embodiment, since all of the elements are the same element type, the mesh sizes of the elements are equal to one another.

The number of the nodes included to the model is set to the field of the number of the nodes. In addition, the number of the elements included to the model is set to the field of the number of the elements. A predictive value of the number of the elements can be calculated by the mesh size, the volume of the shape, and the element type. Further, it is possible to calculate a predictive value of the number of the nodes based on the number of the elements and the element type and it is also possible to increase accuracy by further considering the shape of the model. Regarding the number of the elements and the number of the nodes, in a case where there is already the model information 111 illustrated in (1) to (3) of FIG. 6, the number of the elements and the number of the nodes can be specified based on the model information 111.

The volume of the minimum sphere covering the model is set to the field of the volume of the minimum sphere. Here, the field of the volume of the minimum sphere is used, but the embodiment is not limited thereto. For example, a volume of a minimum cube covering the model may be set to the field of the volume of the minimum sphere.

The surface area of the model is set to the field of the surface area. For example, the field of the boundary condition includes the fields of the constraint condition, a constraint area, the number of degrees of constraint freedom, and the load condition. For example, the constraint condition is set to the field of the constraint condition. As the constraint condition, for example, fixing of one side end surface, fixing of both ends, fixing of entire circumference, and the like can be used. For example, the area constrained on the constraint condition among the surface areas of the model is set to the field of the constraint area. For example, the number of degrees of freedom constrained among the number of degrees of freedom per one node is set to the field of the number of degrees of constraint freedom. For example, in a case where the degree of freedom per one node is three directions, which direction of the three directions is constrained is the number of degrees of constraint freedom. The load condition is set to the field of the load condition. As the load condition, for example, a gravity load in each of directions and the like can be used.

Selection According to Model Size

First, the structure analysis device 100 evaluates the model size based on the information on the analysis target model 101 and selects either the direct method or the iterative method as the solution method by the simultaneous linear equation using the FEM depending on the model size.

The first evaluating unit 502 evaluates the model size of the model based on the model information 111 obtained by the obtaining unit 501. For example, the model size of the model may be the number of the elements, the number of the nodes, and the number of degrees of analysis freedom. In addition, the model size may be a bandwidth, a skyline, a profile, the number of non-zero terms, the number of fill-in terms, and the like with respect to a coefficient matrix or may be a value calculated by combining the bandwidth, the skyline, the profile, the number of the non-zero terms, the number of the fill-in terms.

Specifically, the first evaluating unit 502 evaluates the model size based on the number of the elements and/or the number of the nodes, and/or the number of the degrees of analysis freedom calculated from the model information 111, and the mesh size. For example, in a case where the model information 111 includes information representing the shape of the model such as the volume of the model, the first evaluating unit 502 calculates the number of the elements based on the volume of the model, the mesh size, and the element type. Here, the calculated number of the elements is a predictive value. In addition, for example, the first evaluating unit 502 calculates the number of the nodes based on the volume of the model, the mesh size, and the element type. Here, the calculated number of the nodes is a predictive value. Further, for example, the first evaluating unit 502 calculates the number of degrees of analysis freedom based on the volume of the model, the mesh size, the element type, and the constraint condition. Here, the calculated number of degrees of analysis freedom is a predictive value.

In addition, in a case where the model information 111 includes information of the element, the node, the number of degrees of analysis freedom, and the like, the first evaluating unit 502 may specify the number of the elements, the number of the nodes, and the number of degrees of analysis freedom from the model information 111.

Further, as described above, the number of degrees of analysis freedom is a total of the number of degrees of freedom of each of the nodes included in the model. The number of degrees of analysis freedom is not proved assembly of the simultaneous linear equation performed inside the solver of the CAE is completed. For this reason, a predictive value of the number of degrees of analysis freedom can be calculated by the number of the nodes×the number of degrees of freedom per one node. Here, the number of the elements will be described as an indicator value of the model size. For example, the number of degrees of freedom per one node is determined by the element type, but the number of degrees of freedom per one node may be included in the model information 111.

Next, the selecting unit 504 selects either the direct method or the iterative method as the algorithm of the simultaneous linear equation solution of the structure analysis solver using the finite element method of the model based on an evaluation result of the model size. For example, as the model size is larger, the selecting unit 504 selects the iterative method.

Specifically, for example, the selecting unit 504 obtains a free memory capacity. The free memory capacity is a capacity in a free region among the storage devices such as the RAM 403, the disk 405, and the like. The selecting unit 504 selects either the direct method or the iterative method based on the free memory capacity and the evaluated model size. As the model size is larger, the memory usage increases.

For example, by preparing a threshold value for the free memory capacity according to the model size, if the obtained free memory capacity is equal to or more than the threshold value according to the model size, the selecting unit 504 uses the direct method. If the obtained free memory capacity is less than the threshold value according to the model size, the selecting unit 504 uses the iterative method.

FIG. 7 is an explanatory diagram illustrating an example of a threshold value of the memory capacity according to the number of the elements. For example, a threshold value table 700 includes the threshold value of the memory capacity for each of the numbers of the elements. The number of elements is, for example, 1 to 3000, 3001 to 5000, 5001 to 7000, and 7001 to 10000. For example, if the model size is 4500, a threshold value mt2 corresponding to 3001 to 5000 is selected.

For example, as the model size is larger, the threshold value for the memory capacity increases. For example, a threshold value mt1<the threshold value mt2<a threshold value mt3<a threshold value mt4 is satisfied. Accordingly, as the model size is larger, the threshold value increases, so that the iterative method is used. For this reason, it is possible to avoid a lack of the memory capacity during analysis and reduce the analysis time. In addition, even if the model size is large, since the direct method can be used if the free memory capacity is large, it is possible to increase accuracy of the analysis.

Figure 8:
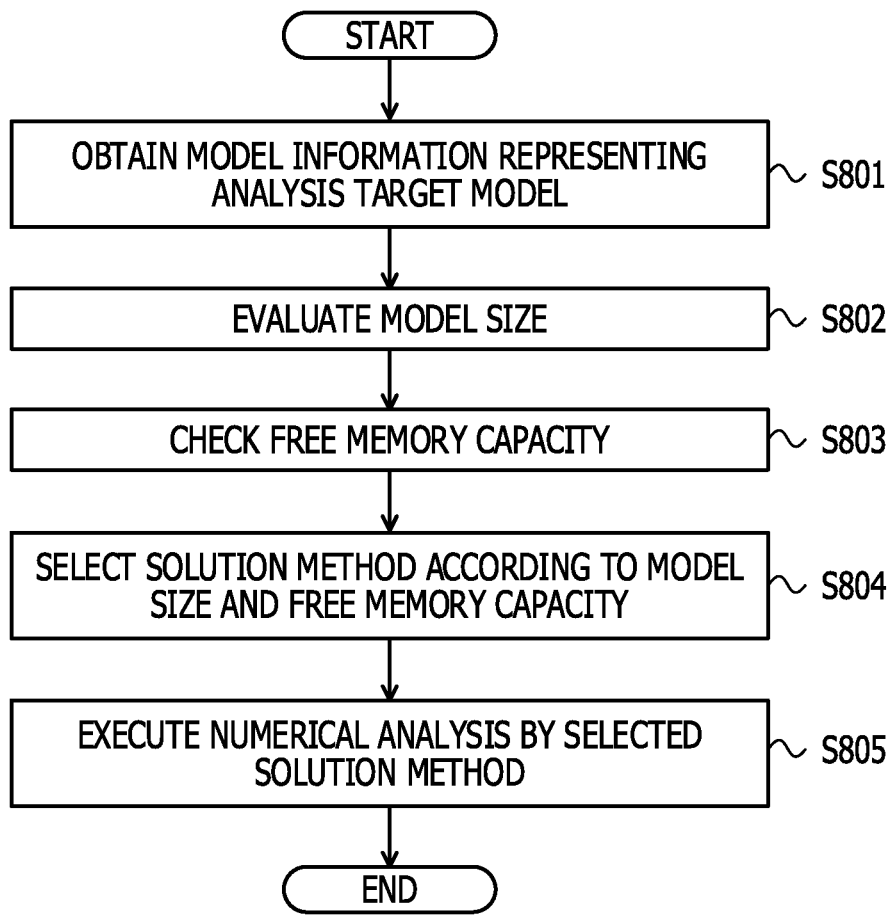
FIG. 8 is a flowchart illustrating an example of a selection processing procedure by the structure analysis device based on a model size.

Example of Selection Processing Procedure by Structure Analysis Device 100 Based on Model Size FIG. 8 is a flowchart illustrating an example of a selection processing procedure by the structure analysis device 100 based on the model size. The structure analysis device 100 obtains the model information 111 representing the analysis target model (step S801). The structure analysis device 100 evaluates the model size (step S802).

Next, the structure analysis device 100 checks the free memory capacity (step S803). The structure analysis device 100 selects the solution method according to the model size and the free memory capacity (step S804). The structure analysis device 100 executes the numerical analysis by the selected solution method (step S805) and ends a series of the process.

Selection According to Strength on Boundary Condition and Model Size

Next, an example of selecting the analysis method based on the strength on the boundary condition and an example of selecting the analysis method based on the strength on the boundary condition and the model size will be described.

The second evaluating unit 503 evaluates the strength on the boundary condition based on the obtained model information 111 and the boundary condition. As described in the model information 111 illustrated in FIG. 5, the boundary condition includes the constraint condition and the load condition. For example, the strength on the boundary condition includes at least strength on the constraint condition and weakness on the load condition.

In the constraint condition, for example, a type or a direction of constraint and a constrained position or region are set. For example, the strength on the constraint condition is strength constrained by the analysis target model on the constraint condition. For example, the strength on the constraint condition is evaluated based on the area of the region corresponding to the constrained range on the surface of the analysis target model according to the constraint condition as described below. In the load condition, for example, a type of a load, a size or a direction of the load, and a position or a region to which the load is applied are set. For example, the weakness of the load condition is evaluated based on a reciprocal number of a size of influence of the load condition on stiffness.

Here, the constraint condition included in the boundary condition will be described as an example and the strength of the constraint condition as the strength on the boundary condition will be described as an example. The second evaluating unit 503 evaluates the strength on the constraint condition based on the constraint area of the model and the degree of constraint freedom. The constraint area is an area of a part constrained inside the model on the constraint condition. More specifically, the second evaluating unit 503 calculates the strength on the constraint condition by the following equation (1).

strength on constraint condition=constraint area/surface area×(number of degrees of constraint freedom per one node/number of degrees of freedom per one node)　　　equation (1)

In a case where a plurality of the constraint conditions are set to the model, a total of the constraint conditions may be used as the strength on the constraint condition of the entire model.

The selecting unit 504 selects either the direct method or the iterative method as the algorithm of the simultaneous linear equation solution of the structure analysis solver using the finite element method of the model based on an evaluation result of the strength on the constraint condition. For example, as the strength on the constraint condition is larger, the selecting unit 504 selects the iterative method. Specifically, for example, in a case where the strength on the constraint condition is equal to or more than a threshold value, the selecting unit 504 selects the iterative method and in a case where the strength on the constraint condition is less than the threshold value, the selecting unit 504 selects the direct method. Here, the threshold value is preset and is stored in, for example, the storage device such as the ROM 402, the RAM 403, the disk 405, or the like.

Next, before explaining an example of detailed selection by the selecting unit 504, a setting method of the threshold value by the selecting unit 504 during the selection will be described. Here, the structure analysis device 100 executes the setting method of the threshold value, but the embodiment is not limited thereto. A device different from the structure analysis device 100 may determine the threshold value and may provide the threshold value to the structure analysis device 100.

First, for example, the structure analysis device 100 prepares the plurality of the constraint conditions for the model and calculates the strength on the constraint condition for each of the constraint conditions. In addition, the structure analysis device 100 executes the numerical analysis by the direct method and the iterative method to the model for each of the plurality of the constraint conditions. The structure analysis device 100 obtains the strength on the constraint condition, in a case where a performance ratio of the analysis time by the direct method to the analysis time by the iterative method is 1, by linear interpolation and sets the strength on the constraint condition as a threshold value.

FIG. 9 is an explanatory diagram illustrating an example of the model used for deriving the threshold value. The derivation of the threshold value will be described as an example with a model m1. A dimension of the model m1 is, for example, a rectangular parallelepiped of 50×100×1000 mm. For example, a constraint condition 1 is a cantilever. For example, a constraint condition 2 is fixing of both ends. For example, a constraint condition 3 is fixing of entire circumference.

In the present embodiment, for each of a case where the model m1 is divided into meshes such that the number of elements is approximately 5000 and a case where the model m1 is divided into meshes such that the number of elements is approximately 10000, the threshold value is set by the strength on the constraint condition and the analysis time.

FIG. 10 is an explanatory diagram illustrating an example for deriving the threshold value in a case where the number of the elements is 5000. (1) to (4) in FIG. 10 illustrate each of numerical values used for deriving the strength on the constraint condition and (5) and (6) in FIG. 10 illustrate the analysis time.

For example, as represented in the equation (1) described above, the structure analysis device 100 calculates the strength on the constraint condition by "constraint area/surface area×(number of degrees of constraint freedom per one node/number of degrees of freedom per one node). (3) in FIG. 10 indicates the constraint area. (1) in FIG. 10 indicates the surface area. (4) in FIG. 10 indicates the number of degrees of constraint freedom per one node. (2) in FIG. 10 indicates the number of degrees of freedom per one node.

In a case of the cantilever on the constraint condition 1, the strength on the constraint condition is "0.016" by "(5000/310000)×(3/3)".

In a case of fixing both ends of the constraint condition 2, the strength on the constraint condition is "0.032" by "(10000/310000)×(3/3)".

In a case of fixing the entire circumference of the constraint condition 3, the strength on the constraint condition is "0.355" by "(110000/310000)×(3/3)".

For example, the structure analysis device 100 obtains the analysis time by executing the numerical analysis by the direct method and the numerical analysis by the iterative method for each of the constraint conditions. The structure analysis device 100 obtains a ratio of the analysis time by the direct method to the analysis time by the iterative method as the performance ratio of an analysis method. (5) in FIG. 10 indicates the analysis time by the direct method. (6) in FIG. 10 indicates the analysis time by the iterative method.

In FIG. 10, there is the performance ratio of "1" between the performance ratio on the constraint condition 2 and the performance ratio on the constraint condition 3. The structure analysis device 100 obtains the strength on the constraint condition in a case where the performance ratio by linear interpolation of the strength on the constraint condition of the constraint condition 2 and the strength on the constraint condition of the constraint condition 3 is 1. The structure analysis device 100 sets the strength on the constraint condition, in the case where the performance ratio is 1, as the threshold value. For example, the embodiment is not limited to the linear interpolation, but Lagrange interpolation, spline interpolation, and least squares method may be used.

$$\begin{aligned}
\text{threshold value} =\ & \text{strength on constraint condition 2} + (\text{strength on constraint} \\
& \text{condition 3} - \text{strength on constraint condition 2}) \times \\
& (1 - \text{performance ratio on constraint condition 2})/ \\
& (\text{performance ratio on constraint condition 3} - \\
& \text{performance ratio on constraint condition 2}) = \\
& 0.032 + (0.355 - 0.032) * (1 - 0.37)/(1.57 - 0.37) = 0.202
\end{aligned}$$

In a case of the constraint condition 2, the analysis time by the direct method is shorter than the analysis time by the iterative method. On the other hand, in a case of the constraint condition 3, the analysis time by the iterative method is shorter than the analysis time by the direct method. For this reason, as described above, if the strength on the constraint condition calculated by the second evaluating unit 503 is equal to or more than the threshold value, the selecting unit 504 selects the iterative method. If the strength on the constraint condition calculated by the second evaluating unit 503 is less than the threshold value, the selecting unit 504 selects the direct method. Therefore, it is possible to reduce the analysis time.

FIG. 11 is an explanatory diagram illustrating an example for deriving the threshold value in a case where the number of the elements is 10000. (1) to (4) in FIG. 11 illustrate each of numerical values used for deriving the strength on the constraint condition and (5) and (6) in FIG. 10 illustrate the analysis time. The strength on the constraint condition is the same as the example in FIG. 10. In FIG. 11, there is the performance ratio of "1" between the performance ratio on the constraint condition 2 and the performance ratio on the constraint condition 3. For this reason, in FIG. 11, since the threshold value is obtained in the same manner in FIG. 10, a detailed description will be omitted, but the threshold value can be found as follows.

threshold value = strength on constraint condition 2 + (strength on constraint condition 3 − strength on constraint condition 2) × (1 − performance ratio on constraint condition 2) / (performance ratio on constraint condition 3 − performance ratio on constraint condition 2) =

0.032 + (0.355 − 0.032) * (1 − 0.47) / (2.16 − 0.47) = 0.133

In addition, the selecting unit 504 illustrated in FIG. 5 selects either the direct method or the iterative method as the algorithm of the simultaneous linear equation solution of the structure analysis solver using the finite element method of the model based on the evaluation result of the model size and the evaluation result of the strength on the constraint condition. Since the model size is evaluated by the first evaluating unit 502 described above, a detailed description will be omitted.

Specifically, for example, when the selecting unit 504 selects either the direct method or the iterative method as the solution method based on the strength on the constraint condition, the selecting unit 504 changes a selection reference based on the model size. In addition, more specifically, for example, the selecting unit 504 selects either the direct method or the iterative method as the solution method based on the model size and selects either the direct method or the iterative method as the solution method based on the strength on the constraint condition. For example, the selecting unit 504 may finally select either the direct method or the iterative method as the solution method based on a selection result according to the model size and a selection result according to the strength on the constraint condition. Here, the example of changing the selection reference based on the model size will be described.

FIG. 12 is an explanatory diagram illustrating an example of the threshold value according to the model size. For example, a threshold value table 1200 includes the threshold value for each of the numbers of the elements. In FIG. 12, the number of elements is used as an example of evaluation of the model size, but the embodiment is not limited thereto. The number of the nodes, the number of degrees of analysis freedom, and the like described above may be used.

In the threshold value table 1200, the number of the elements is, for example, 3000, 5000, 7500, 10000. The threshold value th1 corresponding to the number of the elements of "3000">the threshold value th2 corresponding to the number of the elements of "5000">the threshold value th3 corresponding to the number of the elements of "7500">the threshold value th4 corresponding to the number of the elements of "10000" is satisfied. In this way, as the number of the elements is smaller, the threshold value increases and the number of the elements is larger, the threshold value decreases. Accordingly, as the number of the elements is larger, the threshold value decreases, so that the iterative method is selected.

The selecting unit 504 obtains the threshold value according to the number of the elements from the threshold value table 1200 and compares the calculated strength on the constraint condition with the obtained threshold value. Specifically, for example, if the number of the elements of the analysis target model is equal to or smaller than 4000, the selecting unit 504 obtains the threshold value corresponding to the number of the elements of "3000". Specifically, for example, if the number of the elements of the analysis target model is larger than 4000 and is equal to or smaller than 6250, the selecting unit 504 obtains the threshold value corresponding to the number of the elements of "5000". In this way, a range of the number of the elements may be provided. In a case where the calculated strength on the constraint condition is equal to or more than the obtained threshold value, the selecting unit 504 selects the iterative method and in a case where the calculated strength on the constraint condition is less than the obtained threshold value, the selecting unit 504 selects the direct method.

Next, an example of calculating the strength on the constraint condition and an example of selecting the solution method by the strength on the constraint condition will be described with reference to a specific example.

FIG. 13 is an explanatory diagram illustrating an example of calculating the strength on the constraint condition and an example of selecting the solution method. A dimension of the analysis target model is, for example, 50×100×500.

For example, the first evaluating unit 502 evaluates the model size of the analysis target model. Here, the number of the elements is used as the indicator value of the model size. Next, for example, the second evaluating unit 503 evaluates the strength on the constraint condition based on the constraint condition of the analysis target model.

strength on constraint condition = constraint area / surface area × (number of degrees of constraint freedom per one node / number of degrees of freedom per one node) = (1000/16000) × (3/3) = 0.0625

For example, the selecting unit 504 obtains the threshold value according to the evaluated model size from the threshold value table 1200. In FIG. 13, since the number of the elements is 4724, for example, the selecting unit 504 obtains the threshold value corresponding to the number of the elements of "5000" from the threshold value table 1200. Here, as the threshold value corresponding to the number of the elements of "5000", "0.202" is used in FIG. 10.

For this reason, the selecting unit 504 determines that the strength on the constraint condition is less than the threshold value and selects the direct method. In a case where constraint on the model on the constraint condition is insufficient, the solution is not converged by using the iterative method. For this reason, in a case where the strength on the constraint condition of the model is weak so that the strength on the constraint condition is less than the threshold value, it is possible to reduce the analysis time by selecting the direct method.

Figure 14:
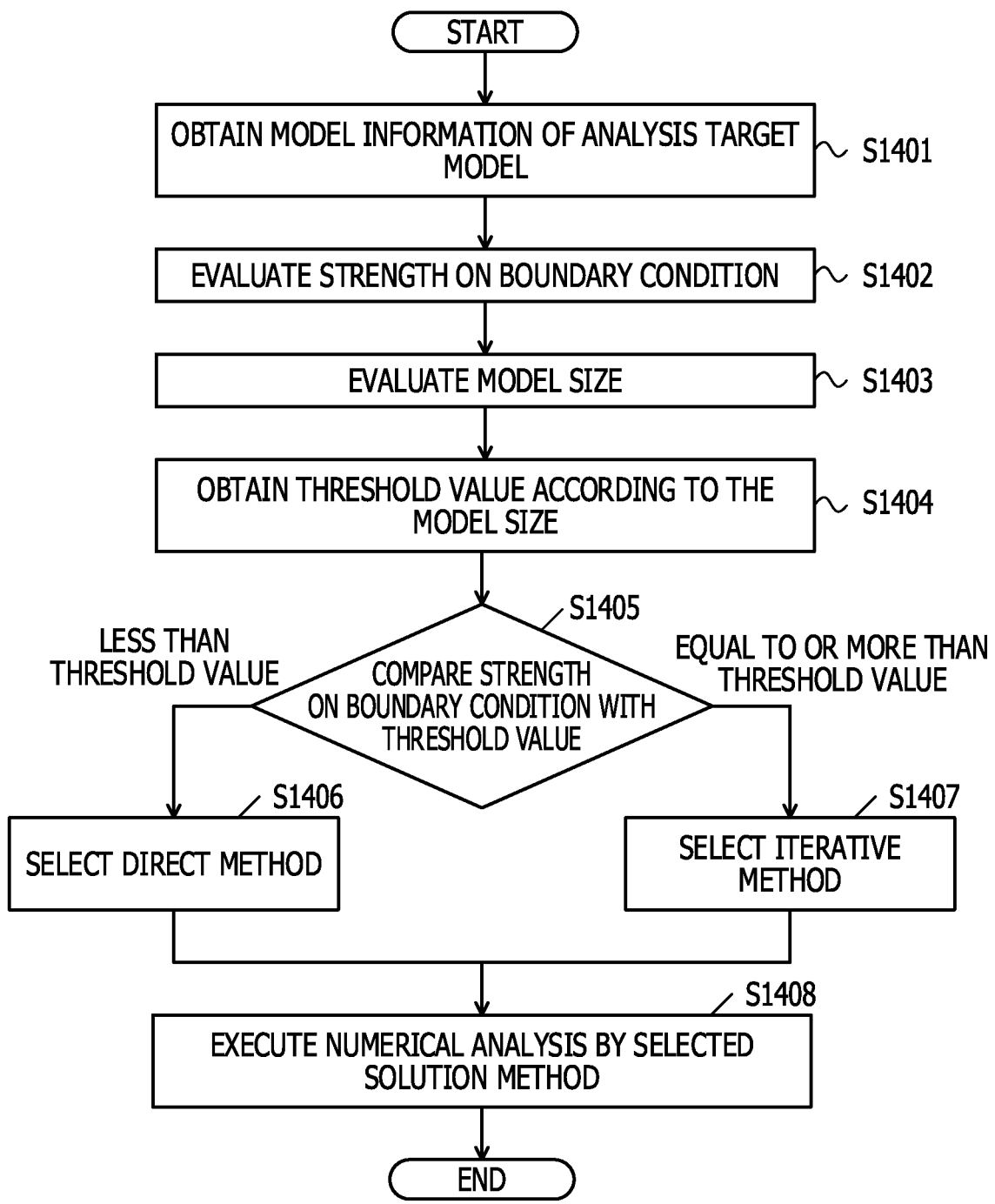
FIG. 14 is a flowchart illustrating an example of a selection procedure by the structure analysis device based on the strength on the constraint condition.

Example of Selection Processing Procedure by Structure Analysis Device 100 Based on Strength on Constraint Condition FIG. 14 is a flowchart illustrating an example of a selection procedure by the structure analysis device based on the strength on the constraint condition. The structure analysis device 100 obtains the model information 111 of the analysis target model (step S1401).

The structure analysis device 100 evaluates the strength on the boundary condition (step S1402). The structure analysis device 100 evaluates the model size (step S1403). Next, the structure analysis device 100 obtains the threshold value according to the model size (step S1404). The structure analysis device 100 compares the strength on the boundary condition with the threshold value (step S1405).

In a case where the strength on the boundary condition is less than the threshold value (step S1405: below threshold value), the structure analysis device 100 selects the direct method (step S1406) and moves the process to step S1408. On the other hand, in a case where the strength on the boundary condition is equal to or more than the threshold value (step S1405: threshold value or more), the structure analysis device 100 selects the iterative method (step S1407) and moves the process to step S1408.

The structure analysis device 100 executes the numerical analysis by the selected solution method (step S1408) and ends a series of the process.

Figure 15:
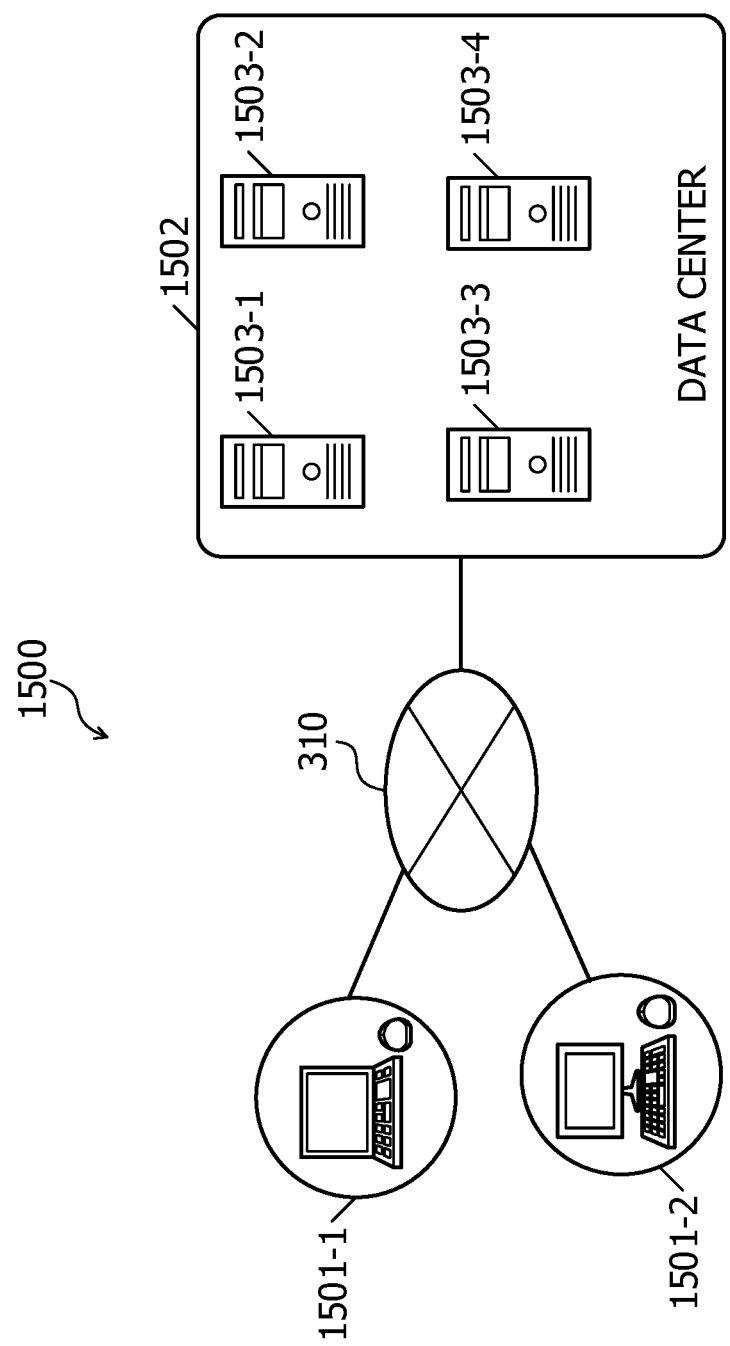
FIG. 15 is an explanatory diagram illustrating an application example of a system.

FIG. 15 is an explanatory diagram illustrating an application example of a system. A system 1500 includes, for example, a client terminal device 1501 and a data center 1502. A plurality of the client terminal devices 1501 may be provided as illustrated in FIG. 15. The data center 1502 includes, for example, a plurality of servers 1503. The client terminal device 1501 and the data center 1502 are connected with each other via the network 410. A management method of the server 1503 in the data center 1502 is not particularly limited.

The structure analysis device 100 may be realized by the client terminal device 1501 and the plurality of the servers 1503. For example, the obtaining unit 501, the first evaluating unit 502, and the second evaluating unit 503 may be realized by the client terminal device 1501 and the selecting unit 504 may be realized by the server 1503. Here, it may be determined in advance that which server 1503 of the data center 1502 causes the selecting unit 504 to perform the process.

For example, the server 1503 executes the CAD and the CAE. The client terminal device 1501 obtains the model information 111 generated by the CAE and evaluates the strength on the constraint condition. The client terminal device 1501 transmits the evaluated strength on the constraint condition to the server 1503. The server 1503 selects either the iterative method or the direct method based on the strength on the constraint condition and executes the numerical analysis by the selected solution method. Here, the server 1503 may register a past analysis result in a database. The server 1503 may select the solution method based on the strength on the constraint condition received from the client terminal device 1501.

Figure 16:
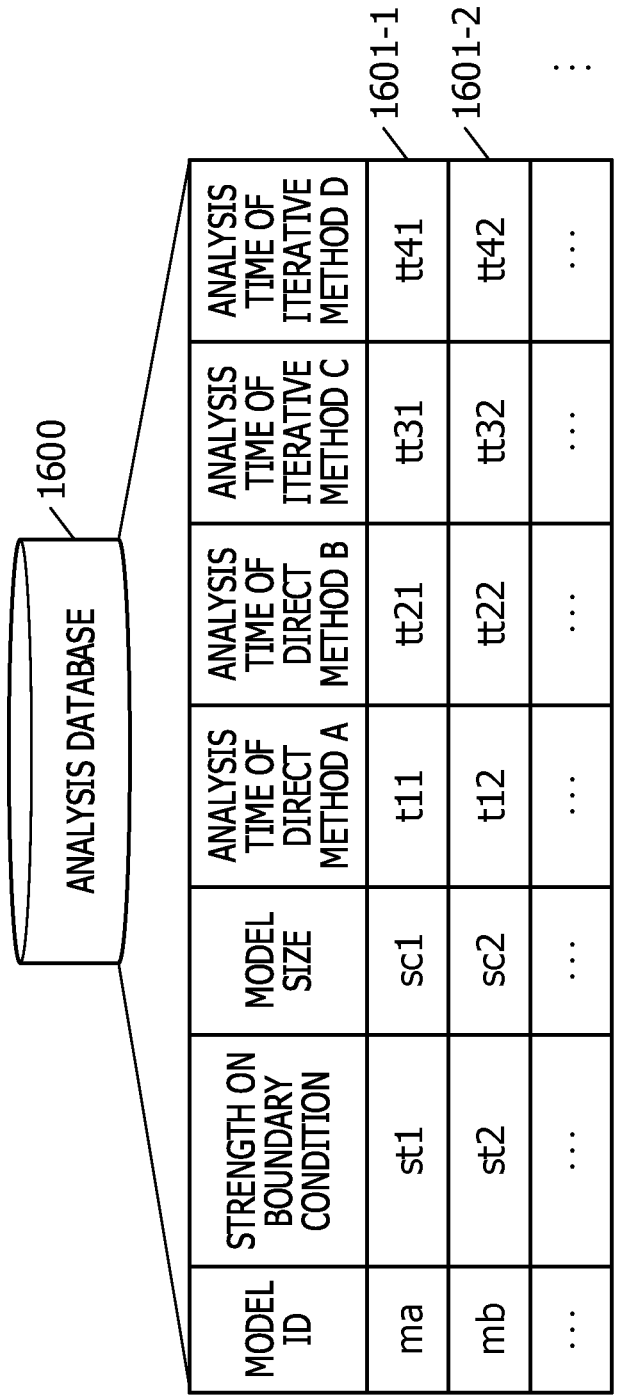
FIG. 16 is an explanatory diagram illustrating an example of an analysis database.

FIG. 16 is an explanatory diagram illustrating an example of an analysis database. An analysis database 1600 includes, for example, the fields of the model ID, the strength on the boundary condition, the model size, the analysis time of a direct method A, the analysis time of a direct method B, the analysis time of an iterative method C, and the analysis time of an iterative method D. By setting information in each of the fields, the information is stored as records (1601-1 and 1601-2). For example, the analysis database 1600 is realized by the storage device such as the ROM 402, the RAM 403, the disk 405, or the like.

Identification information for identifying the model is set to the field of the model ID. The strength on the boundary condition of the model indicated by the model ID is set to the field of the strength on the boundary condition. For example, the strength on the constraint condition is set. The model size of the model indicated by the model ID is set to the field of the model size. For example, the number of the elements is set.

The analysis time in a case of numerical analysis using the direct method A is set to the field of the analysis time of the direct method A. The analysis time in a case of numerical analysis using the direct method B is set to the field of the analysis time of the direct method B. The analysis time in a case of numerical analysis using the iterative method C is set to the field of the analysis time of the iterative method C. The analysis time in a case of numerical analysis using the iterative method D is set to the field of the analysis time of the iterative method D. In this way, since there are various methods as the solution method, the field of the analysis time of each of types of the direct method and the iterative method is prepared. The direct method and the iterative method are not limited thereto and there may be a field of another analysis method.

In addition, not only the field illustrated in FIG. 16, but also the dimension, the volume, the mesh size, the element type, and the like of the model may be stored.

Figure 17:
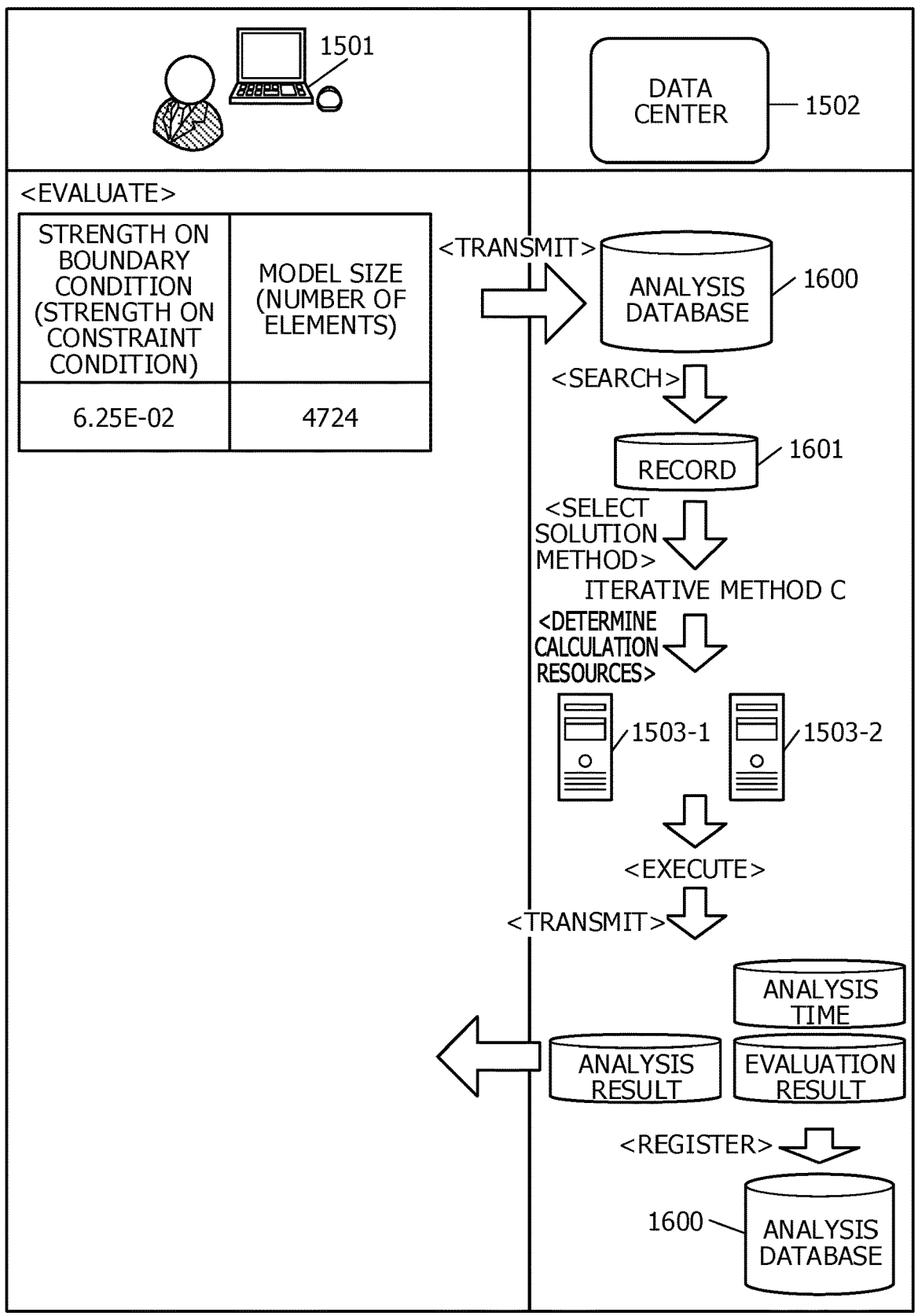
FIG. 17 is an explanatory diagram illustrating an example of selecting the solution method based on a performance in the system.

FIG. 17 is an explanatory diagram illustrating an example of selecting the solution method based on a performance in the system. The client terminal device 1501 transmits the evaluation result such as the strength on the constraint condition, the model size, and the like to the server 1503. Next, the server 1503 searches a record 1601 having an evaluation result closest to the evaluation result received from the client terminal device 1501 from the analysis database 1600. Specifically, the server 1503 may compare the evaluation result with an evaluation result inside the record 1601 included in the analysis database 1600 and may search the record 1601 having the closest evaluation result obtained by scoring similarity.

For example, the server 1503 selects the solution method of the shortest analysis time among the analysis times of the solution methods included in the detected record 1601 as the solution method of the analysis target model. In FIG. 17, the iterative method C is selected. For example, the server 1503 determines calculation resources based on the selected solution method and the selected model size. In FIG. 1, analysis is performed by using the server 1503-1 and the server 1503-2. An example of determining the calculation resources will be described with reference to FIG. 18.

The server 1503-1 and the server 1503-2 perform the numerical analysis on the analysis target model using the selected iterative method C by a parallel process.

Next, the server 1503 transmits the analysis result to the client terminal device 1501. In addition, the server 1503 registers the evaluation result and the analysis time to the analysis database 1600 as the record 1601.

Further, in a case where the calculator resources are free, the server 1503 performs the numerical analysis by the solution method not selected as the solution method on the analysis target model and registers the analysis time to the analysis database 1600.

In addition, in a case where similarity of the detected closest evaluation result is low, the server 1503 may compare the strength on the boundary condition with the threshold value according to the model size to select the solution method as described above.

FIG. 18 is an explanatory diagram illustrating an example of a state of the server and management of the memory capacity. A table 1800 includes information for managing a state of the server 1503 and resources inside the data center 1502. The table 1800 includes, for example, the fields of a server ID, a state, a memory capacity, the number of CPUs, and the like.

Identification information for identifying the server 1503 is set to the field of the server ID. Information indicating the state of the server 1503 is set to the field of the state. FIG. 18, the state of the server 1503 is expressed by "in use" and "unused". In addition, more specifically, the state of the server 1503 may be expressed by the number of the CPUs in use or the like.

The memory capacity of the RAM 403 or the disk 405 included in the server 1503 is set to the field of the memory capacity. For example, the number of processors included in the server 1503 is set to the field of the number of the CPUs.

Here, the memory capacities and the numbers of the CPUs in the servers 1503-1 to 1503-3 are equal to one another, but the memory capacity and the number of the CPUs in the servers 1503-4 are more than the servers 1503-1 to 1503-3 in this case.

There are provided three examples of the analysis target models of x to z. It is assumed to the model sizes of the analysis targets are the same degree. In addition, it is assumed that the strength on the constraint condition of the analysis target model x is ax, the strength on the constraint condition of the analysis target model y is ay, and the strength on the constraint condition of the analysis target model z is az. A relationship between the strength on the constraint conditions satisfies ax>threshold value>ay>az. The iterative method is selected as the solution method of the analysis target model x, the direct method is selected as the solution method of the analysis target model y, and the direct method is selected as the solution method of the analysis target model z.

Here, in a case where the direct method is selected, the server 1503 selects the calculation resources having the larger memory capacity. For example, the server 1503 selects the server 1503-4 as the calculation resources. For example, in a case where the iterative method is selected, the server 1503 selects one of the servers 1503-1 to 1503-3. In addition, in a case where a plurality of the iterative methods can be selected, the server 1503 may cause the plurality of the servers 1503 among the servers 1503-1 to 1503-3 to perform a simultaneous process according to types of the iterative methods. Further, in a case of the solution method capable of performing a parallel process using the plurality of the servers, the server 1503 may select a plurality of calculation resources. In addition, by estimating in advance the calculation resources such as the memory capacity desired for efficient calculation from the model information, the server 1503 may select the appropriate calculation resources according to the estimating result.

For example, the server 1503-4 is selected as the calculation resources for the analysis target model x. For example, the server 1503-1 is selected as the calculation resources for the analysis target model y. For example, the server 1503-2 is selected as the calculation resources for the analysis target model z. In this way, the selecting unit 504 selects the calculation resources for each of the analysis target models.

In addition, in order to select the calculation resources, the table 1800 is used, but the embodiment is not limited thereto.

Flowchart Illustrating Example of Structure Analysis Processing Procedure by System 1500

Figure 19:
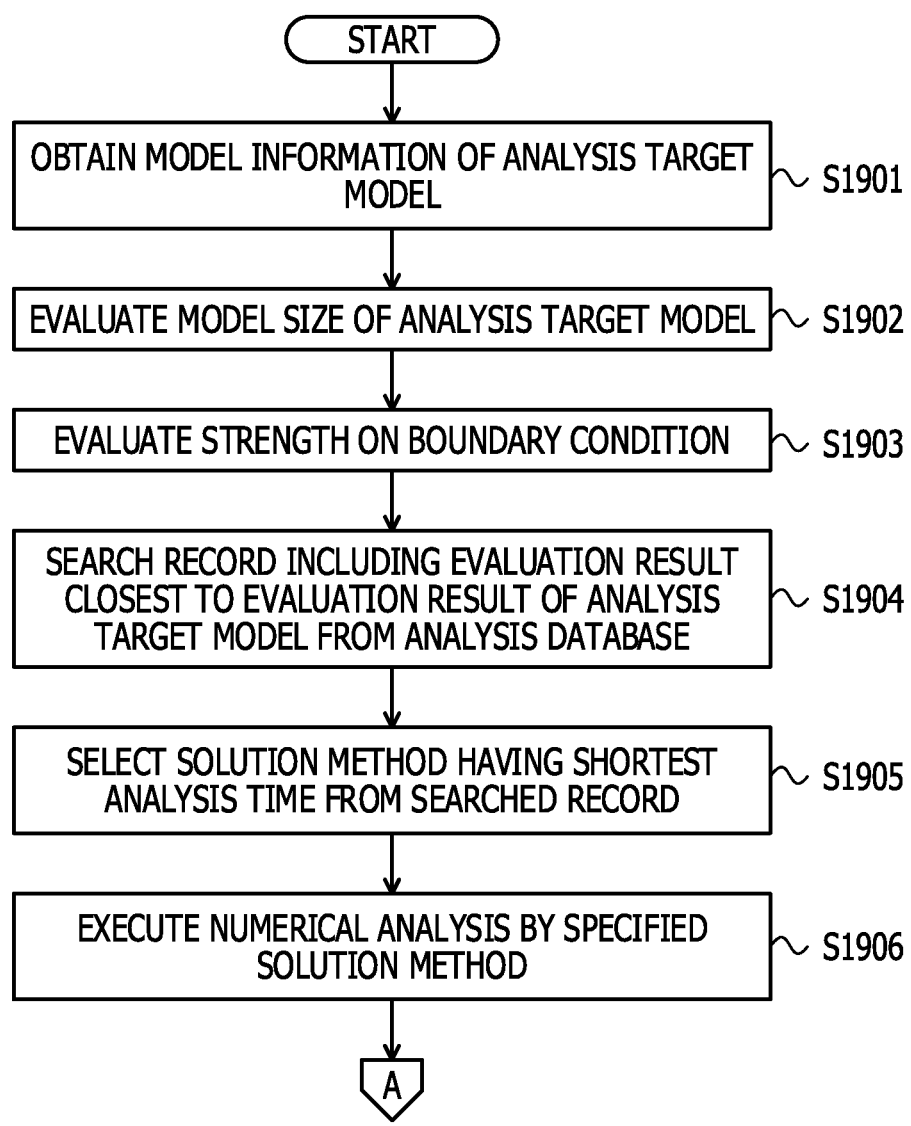
FIG. 19 is a flowchart (first half) illustrating an example of a structure analysis processing procedure by the system.
Figure 20:
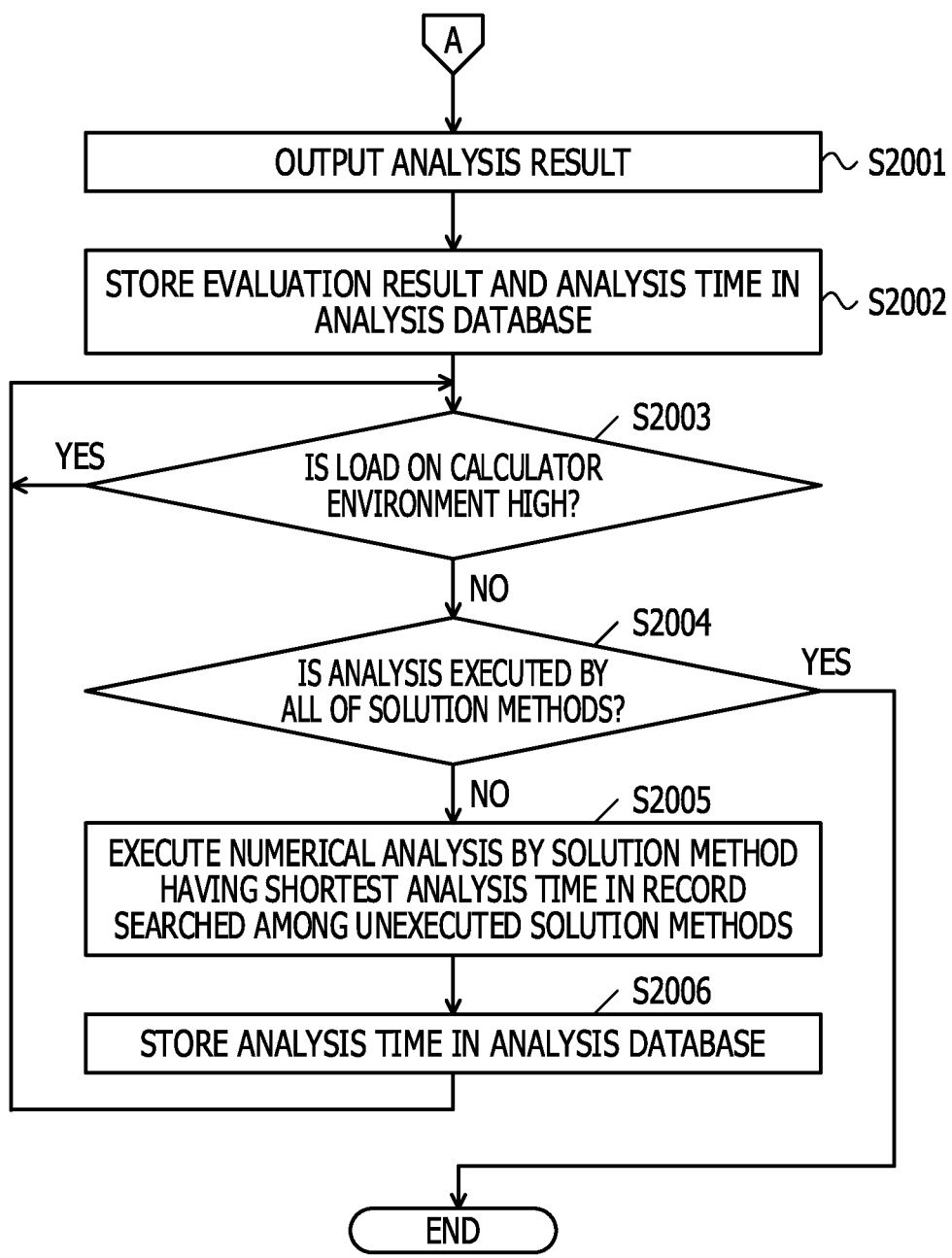
FIG. 20 is a flowchart (latter half) illustrating the example of the structure analysis processing procedure by the system.

FIGS. 19 and 20 are flowcharts illustrating an example of a structure analysis processing procedure by the system. As described above, the system 1500 includes the client terminal device 1501 and the server 1503. For this reason, the server 1503 may perform the process illustrated in FIGS. 19 and 20 and the client terminal device 1501 may perform the process illustrated in FIGS. 19 and 20.

The system 1500 causes the client terminal device 1501 to obtain the model information 111 of the analysis target model (step S1901). Next, the system 1500 causes the client terminal device 1501 to evaluate the model size of the analysis target model (step S1902). The system 1500 causes the client terminal device 1501 to evaluate the strength on the boundary condition (step S1903).

Next, the system 1500 causes the server 1503 to search the record 1601 including an evaluation result closest to the evaluation result of the analysis target model from the analysis database 1600 step S1904). The system 1500 selects the solution method having the shortest analysis time from the record 1601 searched by the server 1503 (step S1905). Next, the system 1500 executes the numerical analysis by the solution method specified by the server 1503 (step S1906).

Next, the system 1500 causes the server 1503 to output the analysis result (step S2001). The system 1500 causes the server 1503 to store the evaluation result and the analysis time in the analysis database 1600 (step S2002). The system 1500 determines whether or not a load on a calculator environment is high (step S2003). In a case where the load on the calculator environment is high (Yes in step S2003), the system 1500 returns to step S2003. The condition that the load on the calculator environment is high means, for example, that there is no server 1503 having no process to be performed.

In a case where the load on the calculator environment is low (No in step S2003), the system 1500 causes the server 1503 to determine whether or not analysis is executed by all of the solution methods (step S2004). In a case where it is determined that analysis is not executed by all of the solution methods (No in step S2004), the system 1500 executes the numerical analysis by the solution method having the shortest analysis time in the record 1601 searched among the unexecuted solution methods (step S2005). The system 1500 causes the server 1503 to store the analysis time in the analysis database 1600 (step S2006) and returns to step S2003. In a case where it is determined that analysis is executed by all of the solution methods in step S2004 (Yes in step S2004), the system 1500 ends a series of the process.

As described above, the structure analysis device 100 evaluates the model size based on the information on the analysis target model and selects either the direct method or the iterative method as the solution method by the simultaneous linear equation using the FEM depending on the model size. Accordingly, since the memory usage can be estimated according to the model size, analysis by the direct method can be possible without a memory lack. Accordingly, it is possible to reduce the analysis time with increased accuracy.

In addition, the structure analysis device 100 evaluates the model size based on the number of the elements and/or the number of the nodes, and/or the number of the degrees of freedom calculated from the model information, the mesh size, and the element type. Accordingly, it is possible to simply evaluate the model size and to reduce the evaluation time.

In addition, the structure analysis device 100 evaluates the strength on the boundary condition based on the boundary condition of the model and selects either the direct method or the iterative method as the solution method by the simultaneous linear equation using the FEM depending on the strength of the boundary condition. Accordingly, it is possible to determine whether or not constraint of the boundary on the boundary condition is stable and to select the solution method appropriate for the model. Therefore, it is possible to reduce the analysis time.

In addition, the structure analysis device 100 evaluates the strength on the boundary condition based on the constraint area and the degree of constraint freedom included in the constraint condition among the boundary conditions of the model. Accordingly, it is possible to simply determine stability of constraint of the boundary and to reduce the time for evaluation.

Further, the structure analysis device 100 evaluates the model size based on the model information, evaluates the strength on the boundary condition based on the boundary condition, and selects either the direct method or the iterative method as the solution method by the simultaneous linear equation using the FEM depending on the model size and the strength of the boundary condition. As a result, it is possible to reduce a possibility that the solution is not converged, the solution method can be selected so that the memory to be used is enough, and it is possible to reduce the analysis time.

In addition, the structure analysis device 100 evaluates the model size based on the number of the elements and/or the number of the nodes, and/or the number of the degrees of freedom calculated from the model information, the mesh size, and the element type. Accordingly, it is possible to simply evaluate the model size and to reduce the evaluation time. Further, the structure analysis device 100 evaluates the strength on the constraint condition based on the constraint area and the degree of constraint freedom included in the constraint condition of the model. Accordingly, it is possible to simply determine stability of constraint of the boundary and to reduce the evaluation time.

In addition, the structure analysis device 100 evaluates the model size of the analysis target model based on the model information, selects the numerical analysis algorithm of structure analysis using the finite element method of the model based on the model size, and determines the calculation resources used for the numerical analysis. Accordingly, it is possible to more appropriately select the solution method and the calculation resources according to characteristics of the numerical analysis of the model and to reduce the analysis time.

In addition, the structure analysis device 100 evaluates the strength on the boundary condition based on the boundary condition of the model, selects the numerical analysis algorithm of structure analysis using the finite element method of the model according to the strength on the boundary condition, and determines the calculation resources used for the numerical analysis. Accordingly, it is possible to more appropriately select the solution method and the calculation resources according to characteristics of the numerical analysis of the model and to reduce the analysis time.

The structure analysis method described in the present embodiment can be realized by causing a computer such as a personal computer, a workstation, or the like to execute a structure analysis program prepared in advance. The present structure analysis program is recorded in a recording medium readable by a computer such as a magnetic disk, an optical disk, a Universal Serial Bus (USB) flash memory, and the like and is executed by causing the computer to read the program from the recording medium. In addition, the structure analysis program may be distributed via a network such as the internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A structure analysis device comprising:
 a memory; and
 a processor coupled to the memory and the processor configured to:
  obtain model information;
  evaluate a size of a model in accordance with the model information;
  obtain memory information indicating a free memory capacity of the memory;
  obtain, from among a plurality of thresholds, a threshold corresponding to the evaluated size of the model;
  select either a direct method or an iterative method as a first algorithm of a simultaneous linear equation of a structure analysis solver that uses a finite element method, wherein the direct method is selected in response to determining that the obtained free memory capacity indicated by the memory information is greater than or equal to the obtained threshold, the iterative method is selected in response to determining that the obtained free memory capacity indicated by the memory information is less than the obtained threshold; and
  execute structure analysis of the model by using the first algorithm.

2. The structure analysis device according to claim 1, wherein the size is evaluated on the basis of at least one of a number of elements and a number of nodes calculated by using the model information, a mesh size, and an element type.

3. The structure analysis device according to claim 1, the processor further configured to:
 obtain a boundary condition of the model; and
 evaluate strength on the boundary condition in accordance with the boundary condition; and
 wherein either the direct method or the iterative method is selected based on the size and the evaluated strength on the boundary condition.

4. The structure analysis device according to claim 3, wherein the strength on the boundary condition is evaluated on the basis of a constraint area and a degree of constraint freedom included in a constraint condition out of the boundary conditions of the model.

5. The structure analysis device according to claim 1, the processor further configured to:
 obtain another boundary condition of another model;
 evaluate strength on the other boundary condition in accordance with the other boundary condition;
 select, in accordance with the evaluated strength on the other boundary condition, either the direct method or the iterative method as a second algorithm of the simultaneous linear equation of the structure analysis solver that uses the finite element method; and
 execute structure analysis of the other model using the second algorithm.

6. The structure analysis device according to claim 1, the processor further configured to: determine calculation resources to be used for the structure analysis of the model on the basis of the size.

7. The structure analysis device according to claim 5, the processor further configured to: determine calculation resources to be used for the structure analysis of the other model on the basis of the strength on the other boundary condition.

8. A structure analysis method executed by a computer, the structure analysis method comprising:
- obtaining model information;
- evaluating a size of a model in accordance with the model information;
- obtaining memory information indicating a free memory capacity of the memory;
- obtain, from among a plurality of thresholds, a threshold corresponding to the evaluated size of the model;
- selecting either a direct method or an iterative method as a first algorithm of a simultaneous linear equation of a structure analysis solver that uses a finite element method, wherein the direct method is selected in response to determining that the obtained free memory capacity indicated by the memory information is greater than or equal to the obtained threshold, the iterative method is selected in response to determining that the obtained free memory capacity indicated by the memory information is less than the obtained threshold; and
- executing structure analysis of the model by using the first algorithm.

9. The structure analysis method according to claim 8, wherein the size is evaluated on the basis of at least one of a number of elements and a number of nodes calculated by using the model information, a mesh size, and an element type.

10. The structure analysis method according to claim 1, further comprising:
- obtaining a boundary condition of the model; and
- evaluating strength on the boundary condition in accordance with the boundary condition; and
- wherein either the direct method or the iterative method is selected based on the size and the evaluated strength on the boundary condition.

11. The structure analysis method according to claim 10, wherein the strength on the boundary condition is evaluated on the basis of a constraint area and a degree of constraint freedom included in a constraint condition out of the boundary conditions of the model.

12. The structure analysis method according to claim 1, further comprising:
- obtaining another boundary condition of another model;
- evaluating strength on the other boundary condition in accordance with the other boundary condition;
- selecting, in accordance with the evaluated strength on the other boundary condition, either the direct method or the iterative method as a second algorithm of the simultaneous linear equation of the structure analysis solver that uses the finite element method; and
- executing structure analysis of the other model by using the second algorithm.

13. The structure analysis method according to claim 8, further comprising: determining calculation resources to be used for the structure analysis of the model on the basis of the size.

14. The structure analysis method according to claim 12, further comprising: determining calculation resources to be used for the structure analysis of the other model on the basis of the strength on the other boundary condition.

15. A structure analysis device comprising:
- a memory; and
- a processor coupled to the memory and the processor configured to:
  - obtain a boundary condition of a model;
  - evaluate strength on the boundary condition in accordance with the boundary condition;
  - select, in accordance with the evaluated strength on the boundary condition, either a direct method or an iterative method as an algorithm of a simultaneous linear equation of a structure analysis solver that uses a finite element method, wherein the direct method is selected in response to determining that the evaluated strength on the boundary condition is greater than or equal to a threshold, the iterative method is selected in response to determining that the evaluated strength on the boundary condition is less than the threshold; and
  - execute structure analysis of the model by using the selected algorithm.

16. A structure analysis method executed by a computer, the structure analysis method comprising:
- obtaining a boundary condition of a model;
- evaluating strength on the boundary condition in accordance with the boundary condition;
- selecting, in accordance with the evaluated strength on the boundary condition, either a direct method or an iterative method as an algorithm of a simultaneous linear equation of a structure analysis solver that uses a finite element method, wherein the direct method is selected in response to determining that the evaluated strength on the boundary condition is greater than or equal to a threshold, the iterative method is selected in response to determining that the evaluated strength on the boundary condition is less than the threshold; and
- executing structure analysis of the model by using the selected algorithm.

* * * * *